(12) United States Patent
Coffman

(10) Patent No.: US 8,059,654 B2
(45) Date of Patent: Nov. 15, 2011

(54) WIRELESS DATAGRAM TRANSACTION PROTOCOL SYSTEM

(75) Inventor: Stephen Blaine Coffman, Sterling, VA (US)

(73) Assignee: AOL, Inc., Dulles, VA (US)

( * ) Notice: Subject to any disclaimer, the term of this patent is extended or adjusted under 35 U.S.C. 154(b) by 0 days.

(21) Appl. No.: 12/776,316

(22) Filed: May 7, 2010

(65) Prior Publication Data

US 2010/0220660 A1 Sep. 2, 2010

Related U.S. Application Data

(60) Division of application No. 11/218,077, filed on Aug. 31, 2005, now Pat. No. 7,746,787, which is a continuation of application No. 10/371,335, filed on Feb. 14, 2003, now Pat. No. 6,965,564.

(51) Int. Cl.
*H04L 12/56* (2006.01)
(52) U.S. Cl. .......................... 370/394; 370/389; 370/473
(58) Field of Classification Search .................. None
See application file for complete search history.

(56) References Cited

U.S. PATENT DOCUMENTS

| | | | |
|---|---|---|---|
| 5,479,441 A | 12/1995 | Tymes et al. | 375/200 |
| 5,513,314 A | 4/1996 | Kandasamy et al. | 395/182.04 |
| 5,604,730 A | 2/1997 | Tiedemann, Jr. | |
| 5,668,803 A | 9/1997 | Tymes et al. | 370/312 |
| 5,696,903 A | 12/1997 | Mahany | 395/200.558 |
| 5,726,984 A | 3/1998 | Kubler et al. | 370/349 |
| 5,862,452 A | 1/1999 | Cudak et al. | 455/6.3 |
| 5,878,351 A | 3/1999 | Alanara et al. | 455/466 |
| 5,912,878 A | 6/1999 | Park et al. | |
| 5,974,300 A | 10/1999 | LaPorta et al. | 455/31.2 |
| 6,002,767 A | 12/1999 | Kramer | 380/24 |
| 6,014,429 A | 1/2000 | LaPorta et al. | 379/88.15 |
| 6,026,379 A | 2/2000 | Haller et al. | 705/34 |
| 6,044,402 A | 3/2000 | Jacobson et al. | |
| 6,058,106 A | 5/2000 | Cudak et al. | 370/313 |
| 6,094,575 A | 7/2000 | Anderson et al. | 455/422 |
| 6,119,167 A | 9/2000 | Boyle et al. | 709/234 |
| 6,128,648 A | 10/2000 | Chen et al. | 709/213 |
| 6,144,653 A | 11/2000 | Persson et al. | 370/337 |

(Continued)

FOREIGN PATENT DOCUMENTS

EP 714 066 5/1996

(Continued)

OTHER PUBLICATIONS

Performance Analysis of UDP with Energy Efficient Link Layer on Markov Fading Channels, P.M. Soni, A. Chockalingam; Wireless Research Lab, Department of Electrical Communication Engineering; http://wrl.ece.iisc.ernet.in, Oct. 2002, pp. 1-28.

(Continued)

*Primary Examiner* — Donald Mills
(74) *Attorney, Agent, or Firm* — Michael A. Glenn; Glenn Patent Group

(57) ABSTRACT

Systems are provided for sequencing, delivery acknowledgement, and throttling of data packets over a network layer, such as UDP and SMS. To support devices with limited battery resources, the invention incorporates asymmetric retry logic and/or acknowledgements with overlapping ranges, to minimize the transmissions required for the device. The sender of a data-bearing frame does not need to wait for a frame to be acknowledged before sending the next, such that many frames can be "in flight" at once.

23 Claims, 43 Drawing Sheets

U.S. PATENT DOCUMENTS

| | | | | |
|---|---|---|---|---|
| 6,151,491 | A | 11/2000 | Farris et al. | 455/412 |
| 6,212,240 | B1 | 4/2001 | Scheibel, Jr. et al. | 375/261 |
| 6,219,537 | B1 | 4/2001 | James et al. | 455/403 |
| 6,320,843 | B1 | 11/2001 | Rydbeck et al. | 370/207 |
| 6,324,564 | B1 | 11/2001 | Thielke et al. | 709/202 |
| 6,373,950 | B1 | 4/2002 | Rowney | 380/255 |
| 6,389,010 | B1 | 5/2002 | Kubler et al. | 370/353 |
| 6,404,761 | B1 | 6/2002 | Snelling et al. | 370/352 |
| 6,418,324 | B1 | 7/2002 | Doviak et al. | 455/556 |
| 6,421,714 | B1 | 7/2002 | Rai et al. | 709/217 |
| 6,424,646 | B1 | 7/2002 | Gerszberg et al. | 370/352 |
| 6,430,409 | B1 | 8/2002 | Rossmann | 455/422 |
| 6,442,532 | B1 | 8/2002 | Kawan | 705/35 |
| 6,581,176 | B1 * | 6/2003 | Seo | 714/749 |
| 6,795,413 | B1 * | 9/2004 | Uhlik | 370/330 |
| 7,457,382 | B1 * | 11/2008 | Jones et al. | 375/347 |
| 7,590,888 | B2 * | 9/2009 | Igarashi et al. | 714/18 |
| 7,626,943 | B2 * | 12/2009 | Nakano | 370/254 |
| 7,839,834 | B2 * | 11/2010 | Horn et al. | 370/343 |
| 2001/0032232 | A1 | 10/2001 | Zombek et al. | |
| 2001/0056492 | A1 * | 12/2001 | Bressoud et al. | 709/227 |
| 2003/0191844 | A1 * | 10/2003 | Meyer et al. | 709/227 |
| 2006/0153096 | A1 * | 7/2006 | Nakano | 370/252 |

FOREIGN PATENT DOCUMENTS

| | | |
|---|---|---|
| EP | 1 148 681 | 10/2001 |
| EP | 1 175 066 | 1/2002 |
| EP | 1 233 578 | 8/2002 |
| EP | 1 248 431 | 10/2002 |

OTHER PUBLICATIONS

A Survey of Energy Efficient Network Protocols for Wireless Networks, Christine E. Jones, Krishna M. Sivalingam, Prathima Agrawal, Jyh-Cheng Chen, Jan. 2000, pp. 1-42.

A Cellular Mobile Telephone System With Load Sharing—An Enhancement of Directed Retry; Karlsson, J.; Eklundh, B.; IEEE Transactions on Communications; May 1989, pp. 1.

Investigating the Energy Consumption of an IEEE 802.11 Network Interface, Laura Marie Feeney, Swedish Institute of Computer Science, Dec. 1999, pp. 1-19.

IEEE 802.11 Tutorial, Mustafa Ergen, University of California Berkeley, Jun. 2002, pp. 1-70.

Minimizing Energy for Wireless Web Access with Bounded Slowdown, Ronny Krashinsky, Hari Balakrishnan, MIT Laboratory for Computer Science, Sep. 2002, pp. 1-12.

M-RPC: A Remote Procedure Call Service for Mobile Clients; Ajay Baker; B. R. Badrinath; Department of Computer Science, Rutgers, The State University of New Jersey, 1995, pp. 1-13.

Communication Networks, Fundamental Concepts and Key Architectures; Alberto Leon-Garcia; 2000; The McGraw-Hill Companies, Inc, 2000, pp. 1-10.

* cited by examiner

Procedure to Determine whether the window is Open to Send a Data Frame

CLASS WDTP_seqnum
Class for Handling
Wrapping Sequence Numbers

CLASS WDTP_window
Class for Handling
Windows of Sequence Numbers

14↘ 460

| Server | |
|---|---|
| Timeout Event | Response |
| Waiting for ACK of each DATA frame sent to Device | Send WINDOW frame to Device |
| Waiting for "missing" DATA frame(s) to arrive from Device | Send Retry frame to Device |

| Device | |
|---|---|
| Timeout Event | Response |
| Waiting for reply INIT frame | Resend INIT frame to Server |
| Waiting for reply READY frame | Resend READY frame to Server |
| Waiting for reply RESET frame | Resend RESET frame to Server |
| Waiting for Window to Open | Send WINDOW frame to Server, Restart Timer |

| Clean Start (Nothing Already Queued to Send on Either Side) |||| 
|---|---|---|---|
| 12~Device || Server~14 ||
| WDTP State | Event | WDTP State | Event |
| Stopped |  | Stopped |  |
| 492 | Send INIT Frame<br>seqnum =<br>next_seqnum-out<br>Version = 1<br>Window_Size=<br>in_Window_Size | | 492 |
| Waiting<br>For Init |  |  |  |
|  |  |  | Receive INIT Frame<br>next_seqnum_in =<br>seqnum<br>Version = 1(Valid)<br>Out_Window_Size= |
|  |  | Waiting<br>For Ready |  |
|  |  |  | Send reply INIT Frame<br>seqnum =<br>next_seqnum_out<br>Version = 1<br>Window_Size=<br>In_Window_Size |
|  | Receive reply<br>INIT Frame<br>Next_seqnum_in =<br>seqnum<br>Version = 1(Valid)<br>Out_Window_Size=<br>Window_Size |  |  |

| Clean Start (Nothing Already Queued to Send on Either Side (contd.) |||| 
| 12~Device || Server ~14 ||
| WDTP State | Event | WDTP State | Event |
| Waiting For Ready | | | |
| | Send READY Frame | | |
| | | | Receive READY Frame |
| | | Running | |
| | | | Send Reply READY Frame |
| | | | \<Can Now Send DATA Frames\> |
| | Receive Reply READY Frame (or DATA Frame) | | |
| Running | | | |
| | \<Can Now Send DATA Frames\> | | |

| Device Sends DATA Frame to Server ||
|---|---|
| 12〜 Device | Server 〜14 |
| Create DATA Frame with the Header [DATA:next_seqnum_out] | |
| Append [data_length] and [data] to the DATA Frame | |
| Add DATA Frame to Outbound Queue (initial state = 'waitingForWindow') | |
| If Window is Open, package DATA Frame in a datagram and send to Server, Set state of DATA frame to 'Sent' | |
| Increment next_seqnum_out | |
| | Extract WDTP from Datagram, Notice it is a DATA Frame |
| | Verify total size of WDTP is greater than 6 bytes, and equals [data_length] + 6 |
| | Validate seqnum in DATA Frame and adjust next_seqnum_in if necessary |
| | seqnum was valid, so, read [data_length] bytes from [data] portion of DATA Frame |
| | Send ACK to Device |

| Server Sends ACK Frame to Device ||
|---|---|
| 12~Device | Server~14 |
| | Create ACK Frame with the header [ACK:seqnum] where seqnum is the same as that in the DATA Frame being ACK'd |
| | Package ACK Frame in Datagram and send to Device |
| Extract WDTP from Datagram, Notice it is an ACK frame | |
| Read seqnum from ACK Frame | |
| Find DATA frame in Outbound Queue with matching seqnum and delete it from the Queue | |

| Error Category | Process Flow in Next Section |
|---|---|
| 1. INIT/READY Frames lost | 1. Init sequence with Timeouts |
| 2. DATA Frames lost | 2. DATA, ACK, WINDOW, RETRY interaction with timeouts |
| 3. ACK Frames lost | 2. DATA, ACK, WINDOW, RETRY interaction with timeouts |
| 4. RETRY Frame lost | 2. DATA, ACK, WINDOW, RETRY interaction with timeouts |
| 5. WINDOW Frame lost | 2. DATA, ACK, WINDOW, RETRY interaction with timeouts |
| 6. RESET Frame lost | 3. Responding to ERROR – Unexpected_frame_while_Running |
| 7. ERROR Frame lost | Not Provided |
| 8. Duplicate Frame received | 3. Responding to ERROR – Unexpected_frame_while_Running |
| 9. Bogus Frame arrives with valid header | Not Provided |
| 10. Frame received with invalid frame type | Not Provided |
| 11. Frame received with invalid sequence number | Not Provided |
| 12. DATA frame received before INIT frame (WDTP state = eWDTP_stopped) | 4. Responding to ERROR – Unexpected_frame_while_Stopped |
| 13. INIT frame received after DATA frame (WDTP state = eWDTP_running) | 3. Responding to ERROR – Unexpected_frame_while_Running |

| 1. INIT/READY Frames Lost ||
|---|---|
| Scenario | Response |
| A. Device sends INIT frame to Server; it never arrives | Device times out waiting for reply and resends INIT frame |
| B. Server replies with INIT frame to Device; it never arrives | Device times out waiting for reply and resends INIT frame |
| C. Device sends READY frame to Server; it never arrives | Device times out waiting for reply and resends READY frame |
| D. Server replies with READY frame to Device; it never arrives | Device times out waiting for reply and resends READY frame |

600 Fig. 35

| 2. DATA Frames Lost (All other Scenarios of Lost DATA Frames can be derived from those Listed here) ||
|---|---|
| Scenario | Response |
| A. Device sends 1 DATA frame; it never arrives | No Action is Taken (Assumes Window is larger than 1) |
| B. Device sends 2 DATA frames; the first never arrives, the second is ACK'd | Server times out waiting for missing DATA Frame; Server sends RETRY Frame |
| C. Device sends N DATA frames that never arrive; window is closed | Device times out waiting for ACK Frame; Device sends WINDOW frame |
| D. Server sends 1 DATA frame; it never arrives | Server times out waiting for ACK Frame; Server sends WINDOW frame |

620 Fig. 36

| 3. ACK Frames Lost ||
|---|---|
| Scenario | Response |
| A. Server replies with ACK frame; it never arrives | Same as Scenarios A, B, and C in "2. Data Frames Lost" |
| B. Device replies with ACK frame; it never arrives | Same as Scenario D in "2. Data Frames Lost" |

640  Fig. 37

| 4. RETRY Frame Lost ||
|---|---|
| Scenario | Response |
| A. Device sends RETRY frame in response to WINDOW frame from Server; it never arrives | Server times out again and resends WINDOW Frame |
| B. Server sends RETRY frame in response to WINDOW frame from Device; it never arrives | Device times out again and resends WINDOW Frame |
| C. Server sends RETRY frame as a result of a missing DATA Frame; it never arrives | Server times out again and resends RETRY Frame |

660  Fig. 38

| 5. WINDOW Frames Lost ||
|---|---|
| Scenario | Response |
| A. Device sends WINDOW Frame to Server; it never arrives | Device times out again and resends WINDOW Frame |
| A. Server sends WINDOW Frame to Device; it never arrives | Server times out again and resends WINDOW Frame |

680  Fig. 39

| 6. RESET Frame Lost ||
|---|---|
| Scenario | Response |
| A. Device sends RESET Frame to Server; it never arrives | Device times out again and resends RESET Frame |
| A. Device sends RESET Frame to Server; Server's reply is lost | Device times out again and resends RESET Frame |

700 Fig. 40

| 7. ERROR Frame Lost ||
|---|---|
| Scenario | Response |
| A. Server sends WINDOW Frame to Device; it never arrives | No Response Required; If ERROR condition occurs again, ERROR Frame will be sent again |

720 Fig. 41

| 8. Duplicate Frame Received ||
|---|---|
| Scenario | Response |
| A. INIT/READY Frames | Special cases covered in Category 13 |
| B. DATA/ACK Frames | Ignore and Discard Frame, no error message |
| C. RETRY/WINDOW Frames | No way to tell duplicate; process it |
| D. RESET Frame | Ignore and Discard Frame, no error message |
| E. ERROR Frame | No way to tell duplicate; process it |

760 Fig. 42

| 9. Bogus Frame Arrives with Valid Header ||
|---|---|
| Scenario | Response |
| A. Frame Length Doesn't Match Frame Type | Ignore and Discard Frame; No Error Message |
| B. Extra data in Frame Fails Validity Checks | Ignore and Discard Frame; No Error Message |
| C. Frame has no extra Data, or Extra Data Passes Validity Checks | Process the Frame |

780  Fig. 43

| 10. Frame received with Invalid Frame Type (Assume Corruption, Recover with Retry Mechanisms) ||
|---|---|
| Scenario | Response |
| A. Device receives WDTP frame with Invalid Frame Type | Ignore and Discard Frame; No Error Message |
| B. Server receives WDTP frame with Invalid Frame Type | Ignore and Discard Frame; No Error Message |

800  Fig. 44

| 11. Frame received with Invalid Sequence Number (Assume Corruption, Recover with Retry Mechanisms) ||
|---|---|
| Scenario | Response |
| A. INIT Frame Received with Corrupt Sequence Number | Ignore and Discard Frame; No Error Message |
| B. READY Frame Received with Corrupt Sequence Number | Ignore and Discard Frame; No Error Message |
| C. DATA Frame Received with Sequence Number Outside of window; Passes other Validity Checks | Ignore and Discard Frame; No Error Message |
| D. ACK Frame Received with Sequence Number Not in Outbound Queue | Ignore and Discard Frame; No Error Message |
| E. RETRY Frame Received with Sequence Number Not in Outbound Queue | Ignore and Discard Frame; No Error Message |
| F. WINDOW Frame Received with Corrupt Sequence Number | Ignore and Discard Frame; No Error Message |
| G. RESET Frame Received with Corrupt Sequence Number, Passes Validity Check | Ignore and Discard Frame; No Error Message |
| H. ERROR Frame Received with Corrupt Sequence Number, Passes Validity Check | Ignore and Discard Frame; No Error Message |

| 12. DATA Frame Received Before INIT Frame (WDTP State = eWDTP_stopped) ||
|---|---|
| Scenario | Response |
| A.<br>- Device goes Out of Coverage<br>- Server Signs the User Off<br>- Device Comes Back Into Coverage and Sends DATA Frame<br>- Server Receives Unexpected DATA Frame | Server Replies with Error Frame: Unexpected_Frame_While_Stopped.<br><br>Device Resets its WDTP Manager and Begins INIT Sequence. 862 |
| B.<br>- Device Signs Off<br>- Sign Off DATA Frame Lost (Server has User Still Online<br>- Device begins INIT Sequence<br>- Server Sends DATA Frame<br>- Device Receives DATA Frame During INIT Sequence | The Device Ignores any DATA frames received during the Initialization Sequence. Also, if the Device Receives latent DATA frames from a Previous Session After the Initialization Sequence is Complete, the Sequence Number will veryLikely be Outside the Valid Window. |

| 12. INIT Frame Received After DATA Frame (WDTP State = eWDTP_running) ||
|---|---|
| Scenario | Response |
| A.<br>- Device Signs Off<br>- Sign Off Data Frame is Lost<br>- Server Still Has User Context<br>- Device Starts Up and Sends Unexpected INIT Frame to Server | Server Replies with ERROR Frame: Unexpected_Frame_While_Running.<br><br>Device does RESET handshake with Server and Begins INIT Sequence. |
| B.<br>- Device Completes Init Sequence with Server<br>- Device hard resets and Reinstalls App<br>- Device Starts Up and Sends Unexpected INIT Frame to Server | Server Replies with ERROR Frame: Unexpected_Frame_While_Running.<br><br>Device does RESET handshake with Server and Begins INIT Sequence. |
| C.<br>- Device Times Out During Init Sequence and Resends INIT Frame<br>- Device completes Init Sequence with Server<br>- Server finally receives first INIT Frame | Server Replies with ERROR Frame: Unexpected_Frame_While_Running.<br><br>Device can Ignore the ERROR Frame. |
| D.<br>- Device sends INIT Frame<br>- Server Replies with INIT Frame; it is somehow delayed<br>- Device Times Out Waiting for INIT Reply and Resends INIT Frame<br>- Server Replies with INIT Frame Again<br>- Init Sequence Completes Successfully<br>- Device Finally Receives First INIT Frame from Server | The Device Ignores any INIT Frame from the Server that Doesn't Have a Matching Init_Key_Field |

| 1. Init Sequence with Timeouts ||||
| 12~Device |  | Server~14 |  |
| WDTP State | Event | WDTP State | Event |
| Stopped |  | Stopped |  |
|  | Send [INIT][1] |  |  |
| waitingforInit |  |  |  |
|  |  |  | [INIT][1] Not Received |
|  | Timed Out Waiting for Reply [INIT][1] |  |  |
|  | Send [INIT][2] |  |  |
|  |  |  | Receive [INIT][2] |
|  |  | waitingForReady |  |
|  |  |  | Send Reply [INIT][2] |
|  | [INIT][2] Not Received |  |  |
|  | Timed Out Waiting for Reply [INIT][2] |  |  |
|  | Send [INIT][3] |  |  |
|  |  |  | Receive [INIT][3] |
|  |  |  | Send Reply [INIT][3] |
|  | Receive Reply [INIT][3] |  |  |
| waitingfor Ready |  |  |  |

| 1. Init Sequence with Timeouts (Contd) ||||
|---|---|---|---|
| 12~ Device || Server ~14 ||
| WDTP State | Event | WDTP State | Event |
| waitingfor Ready | | waitingfor Ready | |
| | Send [READY] | | |
| | | | [READY] Not Received |
| | Timed Out Waiting for Reply [READY] | | |
| | Send [READY] | | |
| | | | Receive [READY] |
| | | Running | |
| | | | Send Reply [READY] |
| | [READY] Not Received | | |
| | Timed Out Waiting For Reply [READY] | | |
| | Send [READY] | | |
| | | | Receive [READY] |
| | | | Send Reply [READY] |
| | Receive Reply [READY] (or [DATA]) | | |
| Running | | | |

| DATA, ACK, WINDOW, and RETRY Interaction with Timeouts ||
|---|---|
| 12 ~ Device | Server ~ 14 |
| WDTP state = eWDTP_Running | WDTP state = eWDTP_Running |
| out_window_size = 2 | out_window_size = 2 |
| next_seqnum_in = 101 | next_seqnum_in = 1 |
| next_seqnum_out = 1 | next_seqnum_out = 101 |

970   Fig. 50

| 2a. Device sends 2 DATA Frames, the first never arrives ||
|---|---|
| 12~ Device | Server ~14 |
| Push [DATA:1], [DATA:2] into outbound queue; Mark their state as "waitingforWindow" | |
| Send [DATA:1], [DATA:2] Mark their state as "sent"; Increment next_seqnum_out to 3 | |
| | [DATA:1] never arrives |
| | Receive[DATA:2] into Inbound queue; Mark [DATA:2] state as "ready" |
| | Create placeholder for [DATA:1] Mark [DATA:1] state as "missing"; Start timer for [DATA:1] |
| | Send[ACK:2][false:0][0] |
| Receive[ACK:2];Delete [DATA:2] from outbound queue | |
| | Timeout waiting for[DATA:1]; Send [RETRY:1][1][1][0]... |
| Receive [RETRY:1][1][1][0]...; Determine that [DATA:1] should be resent | |
| Send [DATA:1] | |
| | Receive[DATA:1] into Inbound queue; Change its state from "missing" to "ready" |
| | Send [ACK:1]; Increment next_seqnum_in to 3 |
| | Process [DATA:1], [DATA:2] when ready |
| Receive[ACK:1];Delete [DATA:1] from outbound queue | |

| 2b. Device sends 3 DATA Frames, 1 and 2 never arrive the window is closed for number 3 ||
|---|---|
| 12~Device | Server~14 |
| Push [DATA:1].. [DATA:3] into outbound queue; Mark their state as "waitingforWindow" | |
| Send [DATA:1], [DATA:2] Mark their state as "sent"; Increment next_seqnum_out to 3 | |
| The window is closed for [DATA:3]; Start a timer waiting for [ACK:1] | |
| Timeout waiting for [ACK:1]; Send [WINDOW:3] | |
| | Receive [WINDOW:3] |
| | Compare '3' to next_seqnum_in (currently = 1) |
| | Create placeholders for [DATA:1] and [DATA:2]; Mark them "missing" |
| | Send [RETRY:1][2][0]... |
| Receive [RETRY:1][2][0]... | |
| Send [DATA:1], [DATA:2]; Restart timer waiting for [ACK:1] | |
| | Receive [DATA:1], [DATA:2] |
| | Send [ACK:1], [ACK:2]; Increment next_seqnum_in to 3 |
| | Process [DATA:1], [DATA:2] when ready |
| Receive [ACK:1], [ACK:2]; Delete [DATA:1] from outbound queue | |
| Send[DATA:3] | |

| 2c. Server sends 2 DATA Frames, the first never arrives ||
|---|---|
| 12~Device | Server~14 |
|  | Push [DATA:101] [DATA:102] into outbound queue; Mark their state as "waitingforWindow" |
|  | Send [DATA:101], [DATA:102] Mark their state as "sent"; Increment next_seqnum_out to 3 |
| [DATA:101] never arrives |  |
| Receive [DATA:102] into Inbound queue Mark [DATA:102] state as "ready |  |
| Create placeholder for [DATA:101]; Mark [DATA:101] state as "missing" |  |
| Send [ACK:102][false:0][0] |  |
|  | Receive [ACK:102][false:0][0] Delete [DATA:102] from outbound queue |
|  | Timer to check for overdue ACK's expires; Discover [ACK:101] is overdue |
|  | Send [WINDOW:103] |
| Receive [WINDOW:103] |  |
| Send [RETRY:101][1][1][0]... |  |
|  | Receive [RETRY:101][1][1][0]... |
|  | Resend [DATA:101] |
| Receive [DATA:101] |  |
| Send [ACK:101]; Increment next_seqnum_in to 103 |  |
|  | Receive [ACK:101]; Delete [DATA:101] from queue |
| Process [DATA:101], [DATA:102] |  |

| 2d. Device sends 1 ACK Frames, it never arrives ||
|---|---|
| 12 ~ Device | Server ~ 14 |
| | Push [DATA:101] into Outbound queue<br>Mark its state as "waitingforWindow" |
| | Send [DATA:101];<br>Mark its state as "sent"<br>Increment next_seqnum_out to 102 |
| Receive [DATA:101] into Inbound queue<br>Mark its state as "ready" | |
| Send [ACK:101];<br>Increment next_seqnum_in to 102 | |
| Process [DATA:101] and remove from Inbound queue | |
| | [ACK:101] never arrives |
| | Timer to check for overdue ACK's expires;<br>Discover [ACK:101] is overdue |
| | Send [WINDOW:102] |
| Receive [WINDOW:102] | |
| Send [RETRY:102][1][1][0]...<br>(Since the inbound queue is empty) | |
| | Receive [RETRY:102][1][1][0]... |
| | Deduce that [DATA:101] was received;<br>Delete [DATA:101] from Outbound queue |

1080  Fig. 54

| 3. Responding to ERROR - Unexpected_frame_while_Running ||||
|---|---|---|---|
| 12 ~ Device || Server ~ 14 ||
| WDTP State | Event | WDTP State | Event |
| stopped | | running | |
| | Send [INIT][1] | | |
| waitingforInit | | | |
| | | | Receive [INIT][1] |
| | | | Send [ERROR][1] (Unexpected_frame_while_Running) |
| | Receive [ERROR][1] | | |
| | Send [RESET] | | |
| waitingfor Reset | | | |
| | | | Receive [RESET] |
| | | | Shutdown WDTP (Purge all Queues) |
| | | stopped | |
| | | | Echo [RESET] back |
| | Receive [RESET] Echo | | |
| | Send [INIT][2] | | |
| waitingforInit | | | |
| | | | Receive [INIT][2] |
| | | | <Continue with init sequence as normal> |

| 4. Responding to ERROR - Unexpected_frame_while_Stopped |||| 
|---|---|---|---|
| 12~ Device || Server ~14 ||
| WDTP State | Event | WDTP State | Event |
| running |  | stopped |  |
|  | Send [DATA] |  |  |
|  |  |  | Receive [DATA] |
|  |  |  | Send [ERROR][2] (Unexpected_frame_while_Stopped) |
|  | Receive [ERROR][2] |  |  |
|  | Shutdown WDTP (Purge all Queues) |  |  |
| stopped |  |  |  |
|  | Send [INIT][1] |  |  |
| waitingforInit |  |  |  |
|  | <Continue with init sequence as normal> |  |  |

1160  Fig. 56

WIRELESS DATAGRAM TRANSACTION PROTOCOL SYSTEM

CROSS REFERENCE TO RELATED APPLICATIONS

This application is a Divisional application of and Claims priority to U.S. application Ser. No. 11/218,077, entitled Wireless Datagram Transaction Protocol System, filed 31 Aug. 2005, which is a Continuation application of and claims priority to U.S. application Ser. No. 10/371,335, entitled Wireless Datagram Transaction Protocol System, filed 14 Feb. 2003, issued as U.S. Pat. No. 6,965,564 on 15 Nov. 2005, which are each incorporated herein in their entirety by this reference thereto.

FIELD OF THE INVENTION

The invention relates to the field of wireless connections between a wireless device and a network. More particularly, the invention relates to wireless datagram protocol processes and structures between a wireless device and a server.

BACKGROUND OF THE INVENTION

In local area networks, such as wireless home networks, one or more wireless devices, e.g. such as IEEE 802.11*b* devices, are typically linked to the network through a server or network access point. Wireless signals link the wireless devices to the server, through forward link and reverse link fading signals. Information to be communicated is organized within streams of packets and datagrams, which are sent in compliance with a communications protocol. While packets and datagrams are controllably sent from a sender to a receiver, some of the packets and datagrams can be lost during transmission, due to wireless signal fading. While communications protocols between wireless devices and servers typically provide means to acknowledge receipt of data and means to request a retransmission of missing data, the acknowledgement and retransmission of data requires a great deal of power expenditure for wireless devices.

P. Soni and A. Chockalingam; *Performance Analysis of UDP with Energy Efficient Link Layer on Markov Fading Channels*; Wireless Research Lab, Department of Electrical Communication Engineering, Indian Institute of Science, Bangalore, India, describe "an analysis of the throughput and energy efficiency performance of user datagram protocol (UDP) using linear binary exponential and geometric backoff algorithms at the link layer (LL)."

Christine E. Jones, Krishna M. Sivalingam, Prathima Agrawal, Jyh-Cheng Chen, *A Survey of Energy Efficient Network Protocols for Wireless Networks*, School of EECS, Washington State University, Pullman Wash., January 2000; describe that the "network interface of wireless networks is a significant user of power, and that research has been devoted to low-power design of the entire network protocol stack of wireless networks in an effort to enhance energy efficiency, and describes recent work addressing energy efficient and low-power design within all layers of the wireless network protocol stack."

T. Laporta, F. Sabnani, and T. Woo, Two-Way Wireless Messaging System With Transaction Server, U.S. Pat. No. 6,014,429, describe "a two-way wireless messaging system, which has a messaging network, and a two-way messaging device that originates, receives and replies to messages having dynamic message components to and from the messaging network. A transaction server is located within the messaging network for opening and tracking messages among various users of the two-way messaging system, and closing a transaction to prevent further message delivery and replies after a predetermined transaction is completed. A transaction can remain open until a reply has been received by every intended message recipient; until a desired number of message recipient received a message; or until a specified amount of time has expired."

W. Thielke, B. Fridman, and V. Shimarov, Optimized Wireless Communication System, U.S. Pat. No. 6,324,564 B1, describe "an optimized wireless communication system which includes an enhanced communications transport protocol to reduce the overhead required by the system and intelligent protocol agents (IPAs) that process and optimize standard applications before passing them on to the transport protocol."

Other publications provide various details of the operation of wireless devices within a network, such as: *A Cellular Mobile Telephone System With Load Sharing—An Enhancement Of Directed Retry*; Karlsson, J.; Eklundh, B.; IEEE Transactions on Communications; May 1989; *Investigating the Energy Consumption of an IEEE 802.11 Network Interface*, Laura Marie Feeney, Swedish Institute of Computer Science, December 1999; *IEEE 802.11 Tutorial*, Mustafa Ergen, University of California Berkeley, June 2002; *Minimizing Energy for Wireless Web Access with Bounded Slowdown*, Ronny Krashinsky, Hari Balakrishnan, MIT Laboratory for Computer Science, September 2002; *M-RPC: A Remote Procedure Call Service for Mobile Clients*; Ajay Bakre; B. R. Badrinath; Department of Computer Science, Rutgers, The State University of New Jersey; J. Kawan; Wireless Transaction And Information System; U.S. Pat. No. 6,442,532; I. Gerszberg, R. Miller, J. Russell, and E. Wallace; Integrated Services Director (ISD) Overall Architecture; U.S. Pat. No. 6,424,646; R. James, D. Nash, and J. Rogers; Apparatus And Method For An Enhanced PCS Communication System; U.S. Pat. No. 6,219,537; R, Farris, and W. Goodman; Mobile Voice Message/Electronic Mail System; U.S. Pat. No. 6,151,491; M. Chen, K. Wu, and P. Yu; Information Handling System And Method For Maintaining Coherency Between Network Servers And Mobile Terminals; U.S. Pat. No. 6,128, 648; M. Cudak, and M. Pearce; Method, Access Point Device And Peripheral Devices For Low Complexity Dynamic Persistence Mode For Random Access In A Wireless Communication System; U.S. Pat. No. 5,862,452; L. Tymes, and G. Ennis; Protocol For Packet Data Communication System; U.S. Pat. No. 5,668,803; L. Tymes, and J. Kramer; Packet Data Communication System; U.S. Pat. No. 5,479,441; Two-Way Wireless Messaging System With Flexible Messaging; European Patent Number EP 825788; A. Rossmann; Method And Architecture For An Interactive Two-Way Data Communication Network; U.S. Pat. No. 6,430,409; N. Rydbeck, B. Molnar, J. Guey, A. Khayrallah, and R. Koilpillai; Wireless Communications Systems With Standard And Robust Services And Methods Of Operation Thereof; U.S. Pat. No. 6,320,843; B. Persson, and J. Turcotte; Method For Communicating In A Wireless Communication System; U.S. Pat. No. 6,144,653; S. Boyle, P. King, B. Martin, A. Rossmann, and B. Schwartz; Pushing And Pulling Data In Networks; U.S. Pat. No. 6,119,167; G. Rai, P. Parsons, and M. Chuah; Efficient Mobility Management Scheme For A Wireless Internet Access System; U.S. Pat. No. 6,421,714; M. Doviak, D. Whitmore, and F. Houvig; Apparatus And Method For Transparent Wireless Communication Between A Remote Device And Host System; U.S. Pat. No. 6,418,324; R. Scheibel, and R. Boxall; Method And Apparatus For Conveying Data Between Communication Devices; U.S. Pat. No. 6,212,240;

R. Snelling, P. McIntosh, J. Taylor, and M. Tucker; Communications to Webs With Personal Communications Links For PSTN Subscribers; U.S. Pat. No. 6,404,761; J. Kubler, and M. Morris; Hierarchical Data Collection Network Supporting Packetized Voice Communications Among Wireless Terminals And Telephones; U.S. Pat. No. 6,389,010; J. Kubler, and M. Morris; Hierarchical Data Collection Network Supporting Packetized Voice Communications Among Wireless Terminals And Telephones; U.S. Pat. No. 5,726,984; R. Mahany; Hierarchical Communications System Using Microlink, Data Rate Switching, Frequency Hopping And Vehicular Local Area Networking; U.S. Pat. No. 5,696,903; K. Rowney; System, Method And Article Of Manufacture For Transmitting Messages Within Messages Utilizing An Extensible, Flexible Architecture; U.S. Pat. No. 6,373,950; G. Anderson, S. Gavette, C. Lindsay, and R. Jensen, Communication System And Method; U.S. Pat. No. 6,094,575; D. Haller, T. Nguyen, K. Rowney, D. Berger, and G. Kramer; System, Method And Article Of Manufacture For Managing Transactions In A High Availability System; U.S. Pat. No. 6,026,379; D. Kandasamy, M. Butler, A. Foss, B. Peterson, C. Patwardhan, M. Ribble, D. Rothmaier, and G. Ramil; Fault Tolerant NFS Server System And Mirroring Protocol; COMPUTER SYSTEM; U.S. Pat. No. 5,513,314; Method For Transferring Resource Information; European Patent Number EP 1148681; Method And System For Providing Connection Handling; European Patent Number EP 1175066; Universal Mobile Telecommunications System (UMTS) Quality Of Service (Qos) Supporting Variable Qos Negotiation; European Patent Number EP 1233578; Method For Achieving End-To-End Quality Of Service Negotiation For Distributed Multimedia Applications; European Patent Number EP 1248431; Communications System And Method Including Energy-Efficient Caching For Mobile Computing; European Patent Number EP 714066; S. Alanara, and S. Willhoff; Methods And Apparatus For Providing Delayed Transmission Of SMS Delivery Acknowledgement, Manual Acknowledgement And SMS Messages; U.S. Pat. No. 5,878,351; T. LaPorta, K. Sabnani, and T. Woo; Two-Way Wireless Cellular Messaging System; U.S. Pat. No. 5,974,300; G. Kramer; System, Method And Article Of Manufacture For A Modular Gateway Server Architecture; U.S. Pat. No. 6,002,767; M. Cudak, B. Mueller, J. Kelton, and B. Classon; and Network Protocol Method, Access Point Device And Peripheral Devices For Providing For An Efficient Centrally Coordinated Peer-To-Peer Wireless Communications Network; U.S. Pat. No. 6,058,106.

The disclosed prior art systems and methodologies thus provide communication architectures and protocols for wireless devices within a network. However, for many wireless devices having limited power resources, the communication architectures and protocols require a large energy expenditure to exchange information.

It would therefore be advantageous to provide a datagram protocol system, which limits the power expenditure of wireless devices. The development of such a protocol system would constitute a major technological advance.

Furthermore, it would be advantageous to provide a datagram protocol system structure and process, which limits the power expenditure of wireless devices by limiting the transmission of frames from a wireless device. The development of such a datagram protocol system would constitute a further technological advance.

In addition, it would be advantageous to provide a datagram protocol system which limits the power expenditure of wireless devices through an asymmetrical retry mechanism between a wireless device and a server, which reduces the transmission of retry frames from the device. The development of such a datagram protocol system would constitute a further technological advance.

As well, it would be advantageous to provide a datagram protocol system structure and process which comprises acknowledgement frames which include information regarding other data, whereby knowledge of the transmission or receipt of a plurality of data frames is contained within an acknowledgement of a single frame of data. The development of such a datagram protocol system would constitute a further major technological advance.

SUMMARY OF THE INVENTION

Systems are provided for sequencing, delivery acknowledgement, and throttling of data packets over a network layer, such as UDP and SMS. To support devices with limited battery resources, the invention incorporates asymmetric retry logic and/or acknowledgements with overlapping ranges, to minimize the transmissions required for the device. The sender of a data-bearing frame does not need to wait for a frame to be acknowledged before sending the next, such that many frames can be "in flight" at once.

BRIEF DESCRIPTION OF THE DRAWINGS

FIG. 28 is a table of server timeout rules in the WDTP system;

FIG. 29 is a table of device timeout rules in the WDTP system;

FIG. 30 and FIG. 31 show process flow in the WDTP system with no errors;

FIG. 32 shows a process for sending DATA frames and acknowledgement ACK frames between a device and a server;

FIG. 33 shows a detailed process for sending acknowledgement ACK frames between a server and a device;

FIG. 34 shows error categories and associated process flows within a wireless datagram transaction protocol (WDTP) system;

FIG. 35 shows error scenarios and responses for lost INIT Frames and READY Frames;

FIG. 36 shows error scenarios and responses for lost DATA Frames;

FIG. 37 shows error scenarios and responses for lost ACK Frames;

FIG. 38 shows error scenarios and responses for a lost RETRY Frame;

FIG. 39 shows error scenarios and responses for a lost WINDOW Frame;

FIG. 40 shows error scenarios and responses for a lost RESET Frame;

FIG. 41 shows an error scenario and response for a lost ERROR Frame;

FIG. 42 shows error scenarios and responses for a duplicate Frame received;

FIG. 43 shows error scenarios and responses the arrival of a bogus frame having a valid header;

FIG. 44 shows error scenarios and responses for a Frame received with an invalid frame type;

FIG. 45 shows error scenarios and responses for a Frame received with an Invalid sequence number;

FIG. 46 shows error scenarios and responses for a DATA Frame which is received before an INIT Frame;

FIG. 47 shows error scenarios and responses for an INIT Frame which is received after a DATA Frame;

FIG. 48 and FIG. 49 show WDTP System process flow through an Init sequence with timeouts;

FIG. 50 shows beginning device and server states for DATA, ACK, WINDOW, and RETRY processes;

FIG. 51 shows exemplary state interactions between a device and a server, when the device sends two DATA Frames, and the first never arrives at the server;

FIG. 52 shows exemplary state interactions between a device and a server, when the device sends three DATA Frames, wherein the first and second Frames never arrive at the server, and wherein the WINDOW is closed for the third Frame;

FIG. 53 shows exemplary state interactions between a device and a server, when the server sends two DATA Frames, and the first never arrives at the device;

FIG. 54 shows exemplary state interactions between a device and a server, when the device sends an ACK Frame, which never arrives at the server;

FIG. 55 shows exemplary state interactions between a device and a server, when the server receives an unexpected Frame while in the Running state; and FIG. 56 shows exemplary state interactions between a device and a server, when the server receives an unexpected Frame while in the Stopped state.

DETAILED DESCRIPTION OF PREFERRED EMBODIMENTS

Figure 1:
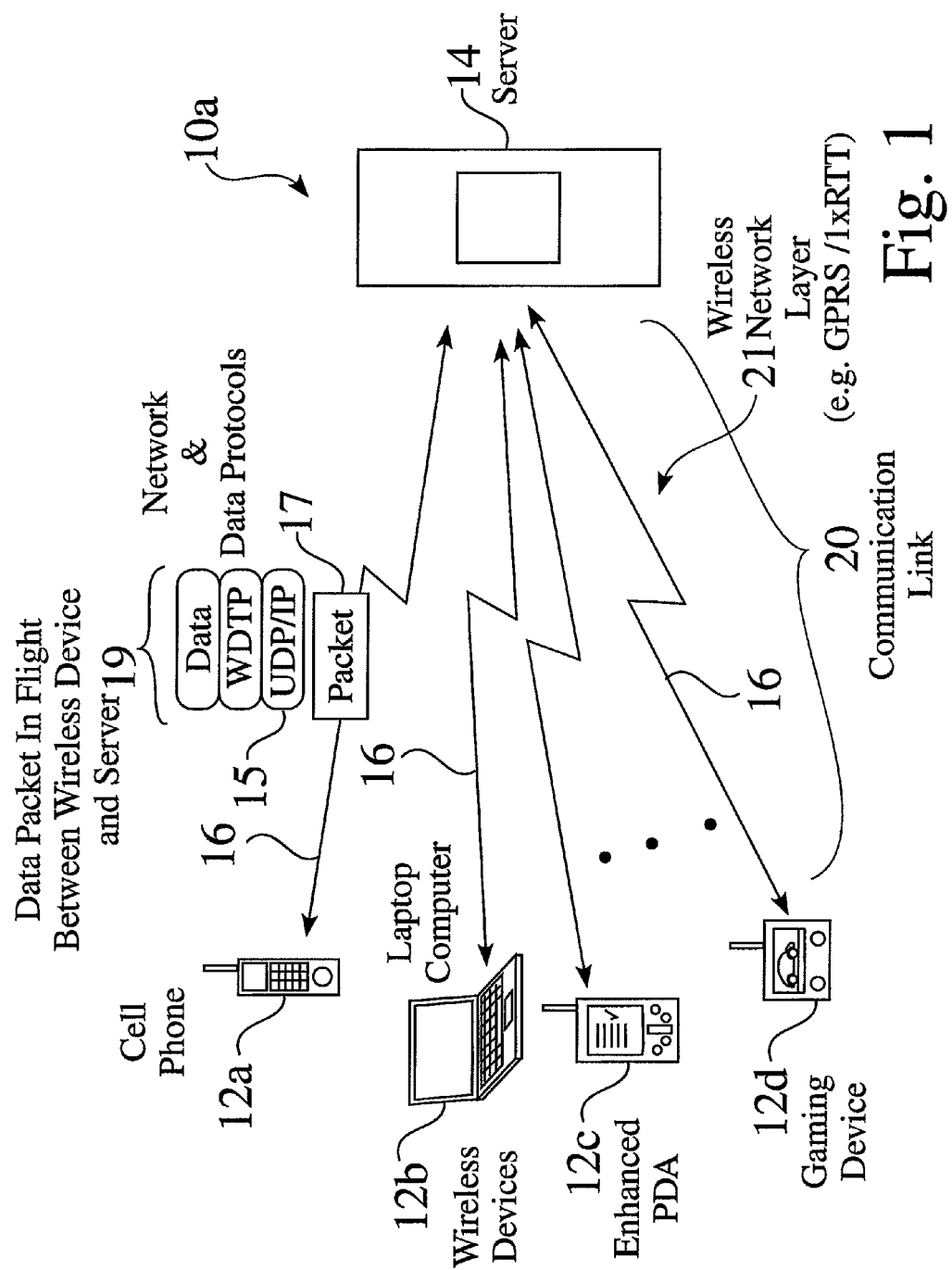
FIG. 1 is a schematic view of wireless devices in wireless communication with a server.

FIG. 1 is a schematic plan view of a wireless communication system 10a, between a wireless device 12 and a secondary device 14, such as a server 14. Examples of portable wireless devices 12 currently comprise but are not limited to cellular phones 12a, portable, i.e. laptop computers 12b, personal digital assistants PDAs 12c having communications capabilities, and/or gaming devices 12d having communications capabilities.

Wireless devices 12 typically comprise a portable energy, i.e. battery, storage 54 (FIG. 3), by which a wireless device can be operated as a portable device. For portable operation, a communication link 20 from a wireless device 12 comprises a wireless signal 18 (FIG. 2), through which packets 17 are transmitted and received.

Figure 2:
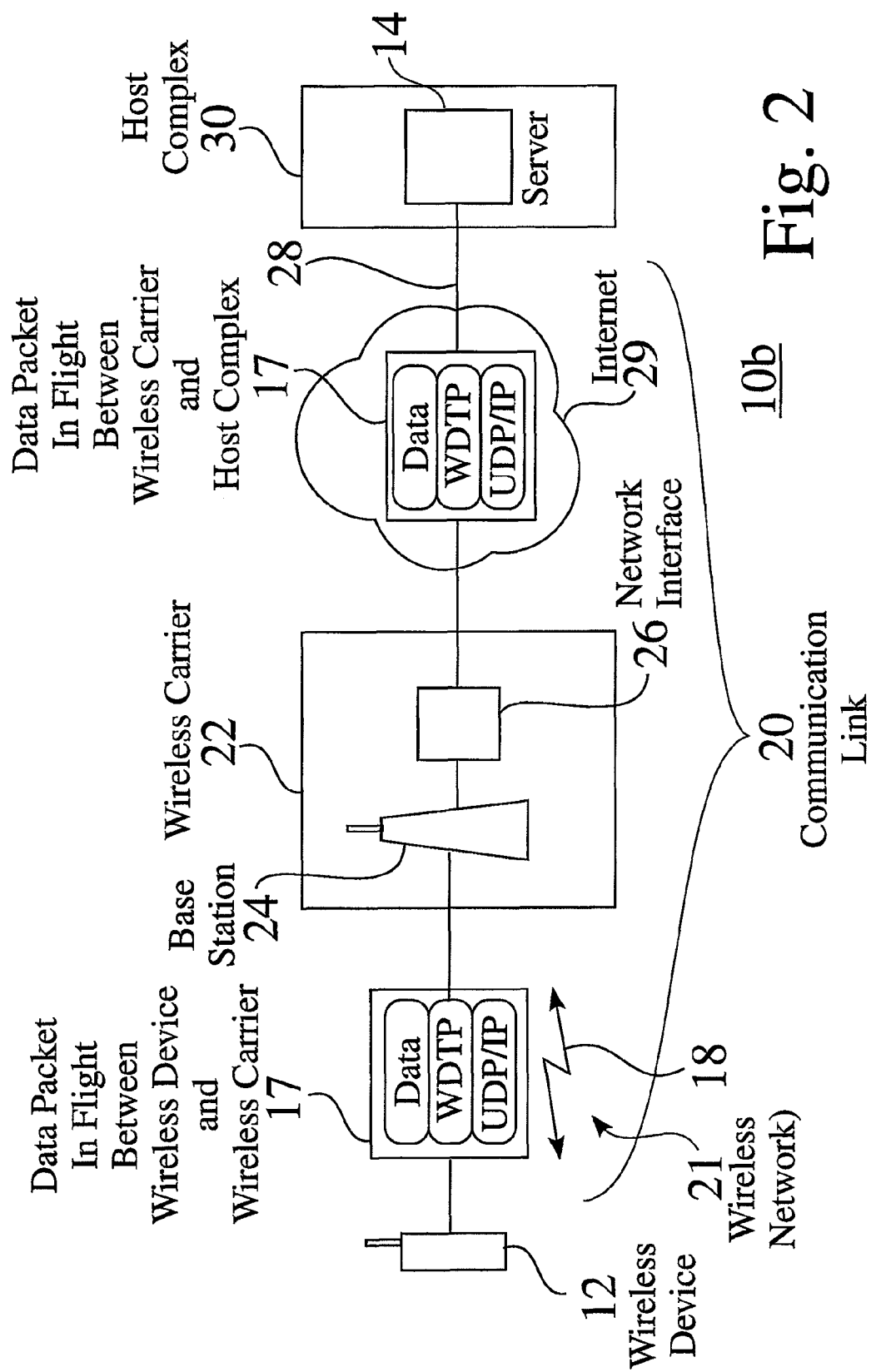
FIG. 2 is a schematic view of a wireless datagram transaction protocol (WDTP) system.

FIG. 2 is a schematic plan view of an exemplary wireless communication system 10b, between a wireless device 12 and a secondary device 14, such as a server 14. As seen in FIG. 2, an intermediate wireless carrier 22, comprising a base station 24 connected to a network interface 26, is located between the wireless device 12 and a server 14 at a host complex 30. A secondary link 28, such as through a network or Internet 29, is located between the wireless carrier 22 and the host complex 30. The communication link 20 shown in FIG. 2 comprises both a wireless signal 18 between the wireless device 12 and the wireless carrier 22, as well as the secondary link 28, such as a wired or wireless link 28, between the wireless carrier 22 and the server 14 at the host complex 30.

Figure 3:
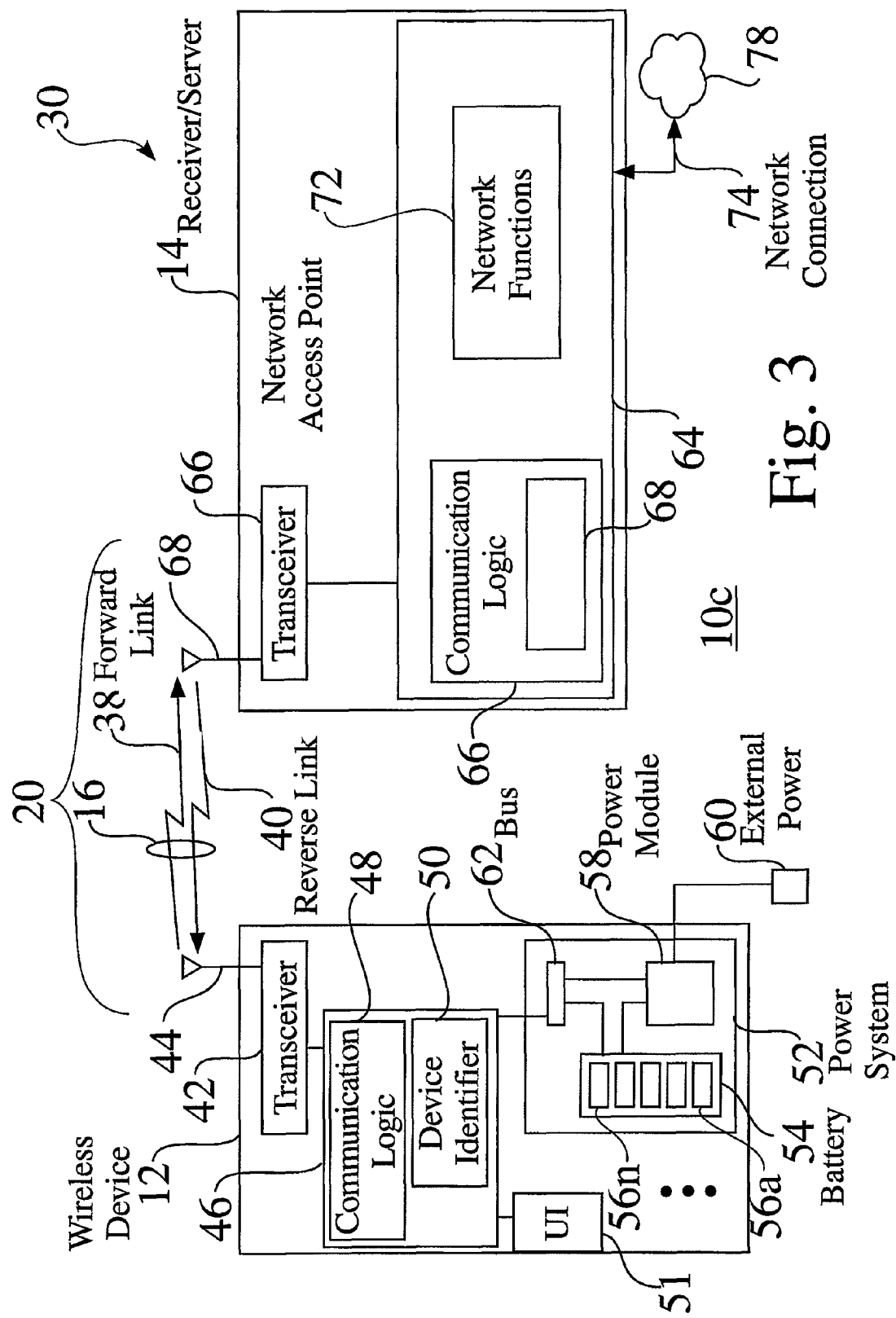
FIG. 3 is a detailed schematic view of a wireless device wireless datagram transaction protocol (WDTP) communication between a device and a server.

FIG. 3 is a detailed schematic view of a wireless communication system 10c, in which wireless communication complies with a wireless datagram transaction protocol (WDTP) system 100 (FIG. 7), which comprises an asymmetric exchange of packets 17 across a communication link 20, such that the energy expenditure 54,56 (FIG. 3) is minimized for the wireless device 12.

The wireless device 12 shown in FIG. 3 comprises a transceiver 42 and an antenna 44, by which a wireless signal 16, comprising a forward link 38, which is transmitted from the wireless device 12, and a reverse link 40, which is received by the wireless device 12. The wireless device 12 in FIG. 3 comprises a processor 46, communication logic 48, and a user interface 51. A device identifier 50 is also typically associated with the wireless device 12.

The wireless device 12 also comprises a power system 52, comprising a battery 54 having limited energy storage 56a-56n, such as a rechargeable or replaceable battery 54. Wireless devices 12 often further comprise means for wired operation, such as a power module 58 which is connectable to external power 60. A power bus 62 is connected between the power system 52 and device componentry, such as the processor 46.

Wireless devices 12 typically operate in a portable environment, in which a portable battery 54 is required. While the physical size and weight of portable batteries 54 has decreased over time, total operation time for a battery 54 is still limited by the available capacity 56a-56n of the battery 54 and the power requirements of the wireless device 12.

While the wireless datagram transaction protocol system 100 can be used to support communication across any communication system 10, the wireless datagram transaction protocol system 100 is ideally suited to support wireless devices 12 having limited battery resources 54,56, since WDTP incorporates an asymmetric retry logic that minimizes transmissions required by the portable device 12. WDTP is readily adapted to applications which communicate over a wireless network, such as a TDMA based wireless packet network, e.g. a GPRS or an EDGE network, or a CDMA based wireless packet network, e.g. a 1xRTT or a 1xEV network.

As seen in FIG. 2, packets 17 are comprised of structured datagrams 19, which conform to the wireless communication network 21. The wireless datagram transaction protocol system 100 is readily adapted to a wide variety of datagram structures 19.

While the wireless datagram transaction protocol system 100 is typically implemented for device-server communications, alternate embodiments of the wireless datagram transaction protocol system 100 provides device-device communications.

Figure 4:
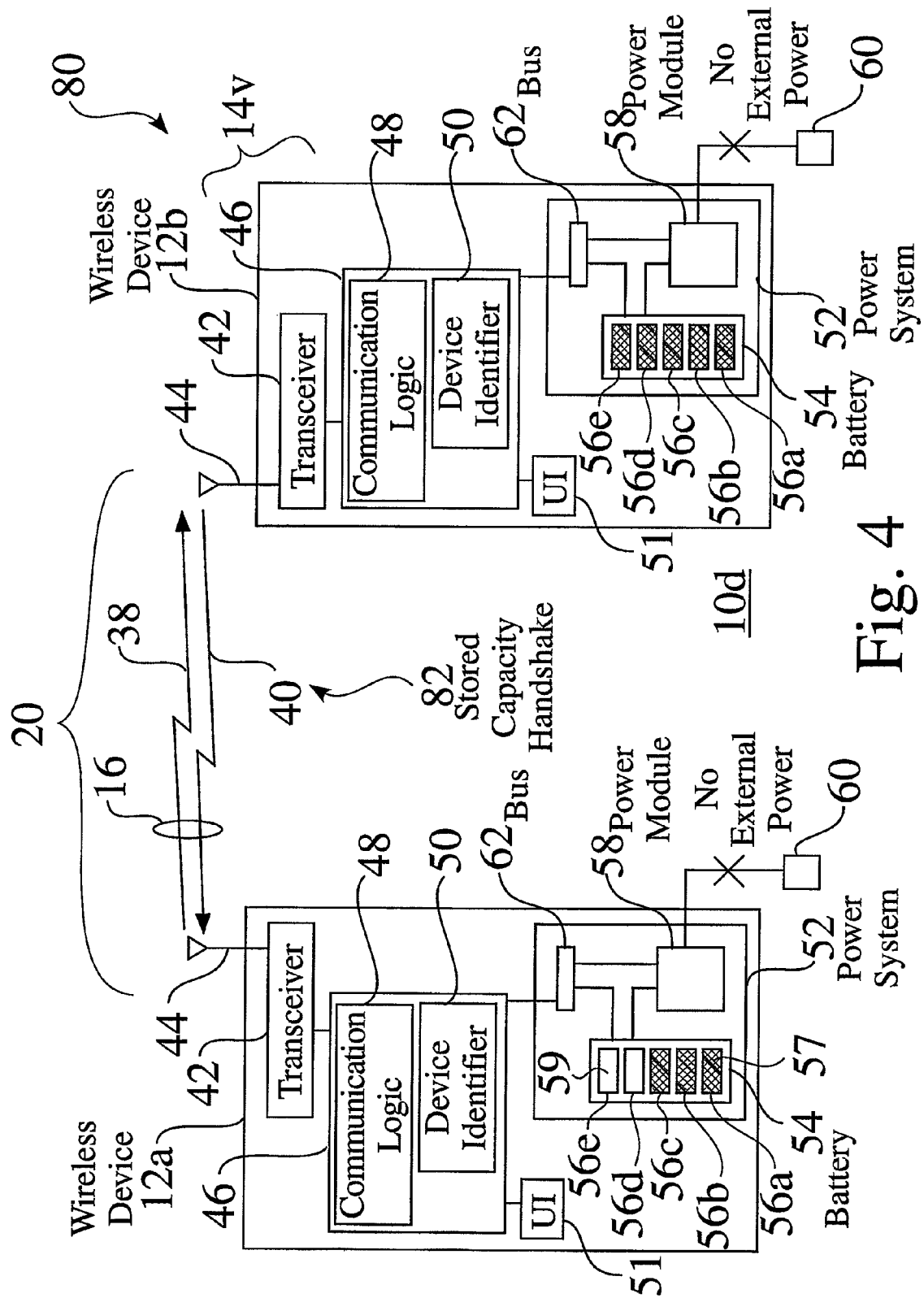
FIG. 4 is a detailed schematic view of a wireless communication system between a first portable device and a second portable device.

FIG. 4 is a detailed schematic view of a wireless communication system 10d between a first device 12a and a second device 12b. As seen in FIG. 4, the wireless devices 12a,12b each have a power system 52, comprising a battery 54 having limited energy storage 56a-56e, such as a rechargeable or replaceable battery 54. While the wireless devices shown in FIG. 4 also comprise a power module 58 which is connectable to external power 60, both wireless devices 12a,12b are operating in a wireless environment. As seen in FIG. 4, the energy storage 56a-56c of the first wireless device 12a is charged 57, while energy storage 56d,56e is depleted 59. Also as seen in FIG. 4, the entire energy storage 56a-56e of the second wireless device 12b is charged 57.

In the wireless communication system 10d shown in FIG. 4, a stored energy handshake 82 is exchanged between the wireless devices 12a,12b, such that the wireless datagram transaction protocol system 100 may be used, as necessary, to conserve battery resources as needed. For example, during initial communication between the devices, the stored energy capacity 56, e.g. such as battery storage level or available operating time, is communicated and compared between the wireless devices 12a,12b.

In the scenario shown in FIG. 4, the available capacity 56 of the first wireless device 12a is less than the available capacity 56 of the second wireless device 12b, such that the wireless datagram transaction protocol system 100 may be implemented to conserve power of the first wireless device 12a. For example, as a result of the stored energy handshake 82, the device 12 having a greater energy storage 56, e.g. the second device 12b, assumes the role of a virtual server 14v, whereby the WDTP system 100 operates the second device 12b as a server 14, as described herein, i.e. assuming the role of a server 14, to conserve the available power 56 for the first wireless device 12a.

Figure 5:
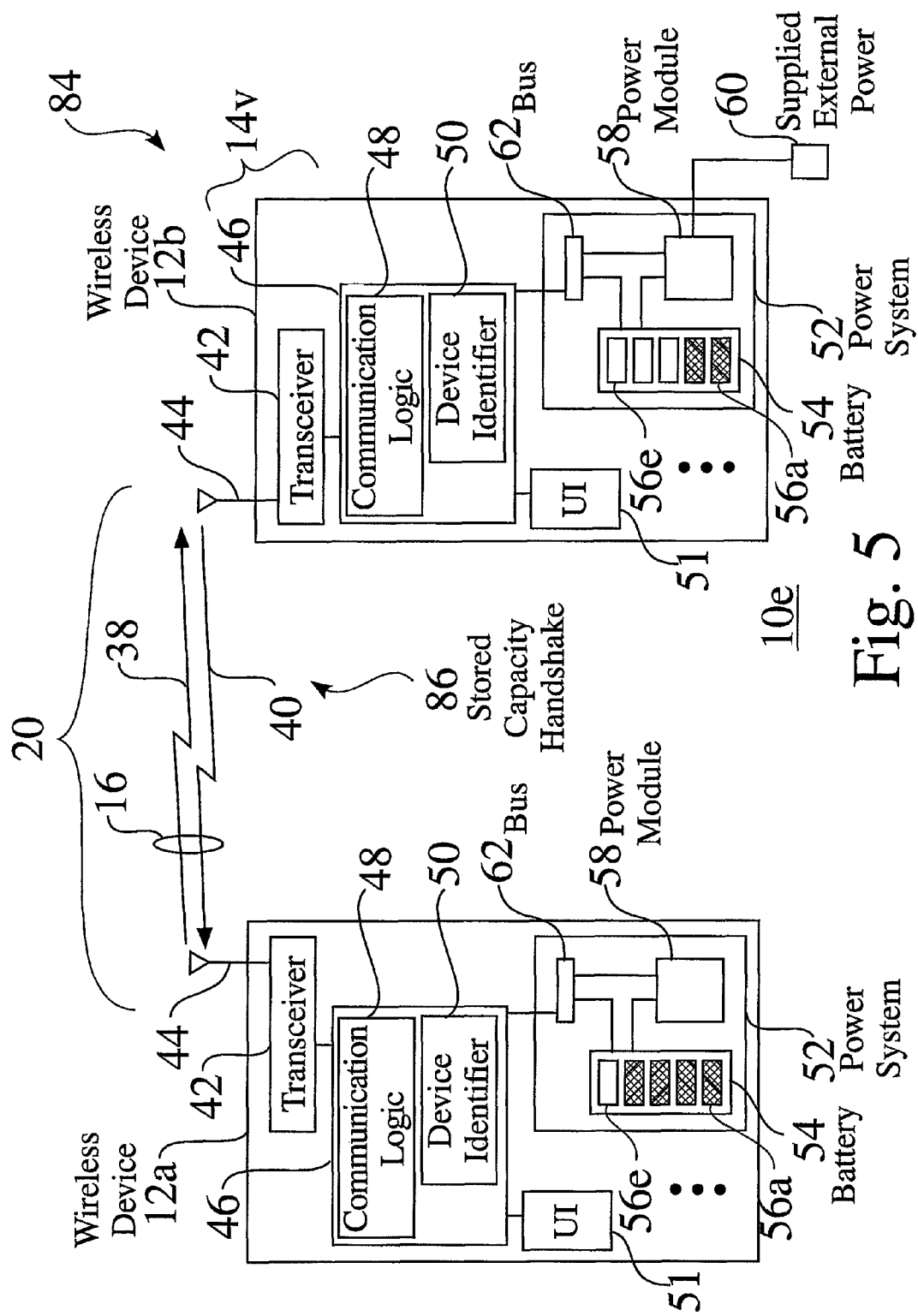
FIG. 5 is a detailed schematic view of an alternate wireless communication system between a wireless first device and an externally powered second device.

FIG. 5 is a detailed schematic view of an alternate wireless communication system 10e between a first device 12a and a second device 12b. As seen in FIG. 5, the wireless devices 12a,12b each have a power system 52, comprising a battery 54 having limited energy storage 56a-56n, such as a rechargeable or replaceable battery 54. While the wireless devices 12a,12b shown in FIG. 5 also comprise a power module 58 which is connectable to external power 60, the first device 12a is operating in a wireless environment, while the second device is connected to supplied external power 60.

As seen in FIG. 5, while the energy storage 56a-56d of the first wireless device 12a is charged 57 to a greater level than the energy storage 56a,56b of the second device 12b, the second device is connected to supplied external power 60, such that the second device 12b has less need to conserve battery storage 56, i.e. the device is operated as a wired device 12, whereby the battery 54 is also typically charged.

In the wireless communication system 10e shown in FIG. 5, an energy source handshake 86 is exchanged between the wireless devices 12a,12b, such that the wireless datagram transaction protocol system 100 may be used, as necessary, to conserve battery resources as needed. For example, during initial communication between the devices 12a,12b, the current power source 54,60 for each device 12 is compared 86, such that a wired device, e.g. the second device 12b, may be operated as a virtual server 14v, to conserve power 56 of the wireless device 12a.

Figure 6:
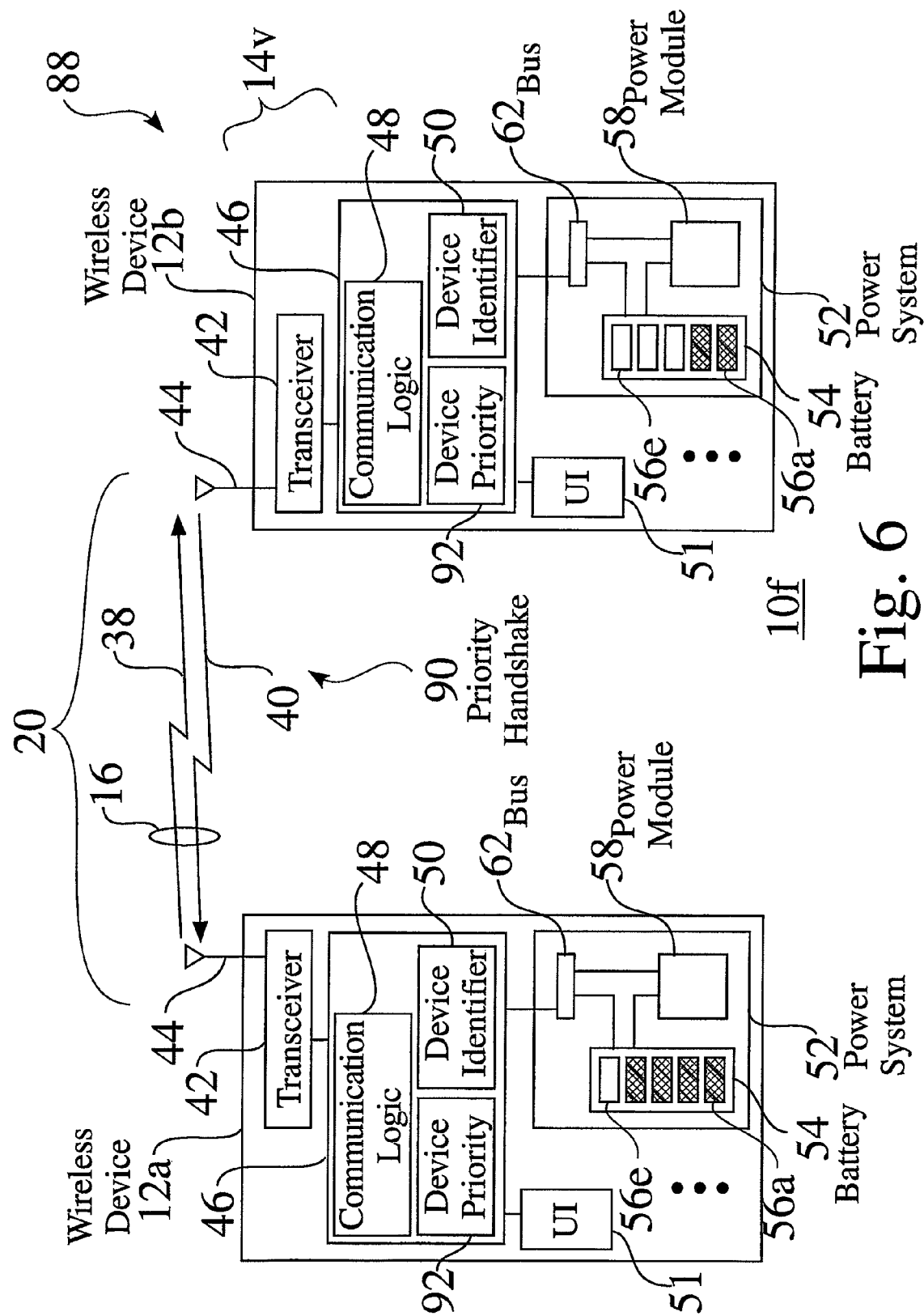
FIG. 6 is a detailed schematic view of an alternate prioritized wireless communication system between a first device and a second device.

FIG. 6 is a detailed schematic view 88 of an alternate wireless communication system 10f between a first device 12a and a second device 12b. As seen in FIG. 6, the wireless devices 12a,12b each have a power system 52, comprising a battery 54 having limited energy storage 56a-56e, such as a rechargeable or replaceable battery 54. As well, each of the devices further comprises a device priority 92, such that the wireless datagram transaction protocol system 100 may be applied as a function of priority 92, whereby the priority 92 of devices 12 is compared 90 to determine either energy conservation status or virtual server status. In the exemplary embodiment 10f seen in FIG. 6, while the available power capacity 56 of the second device 12b is lower than the available power capacity 56 of the first device 12a, the priority 92 of the first device 12b may prevent the first device 12a from operating as a virtual server 14v.

In the alternate wireless communication system 10f, the first device 12a has a higher priority 92 than the second device 92, such that other devices 12, e.g. such as device 12b, are required to communicate either as a virtual server 14v, or as an equal device, such as in symmetric manner.

Figure 7:
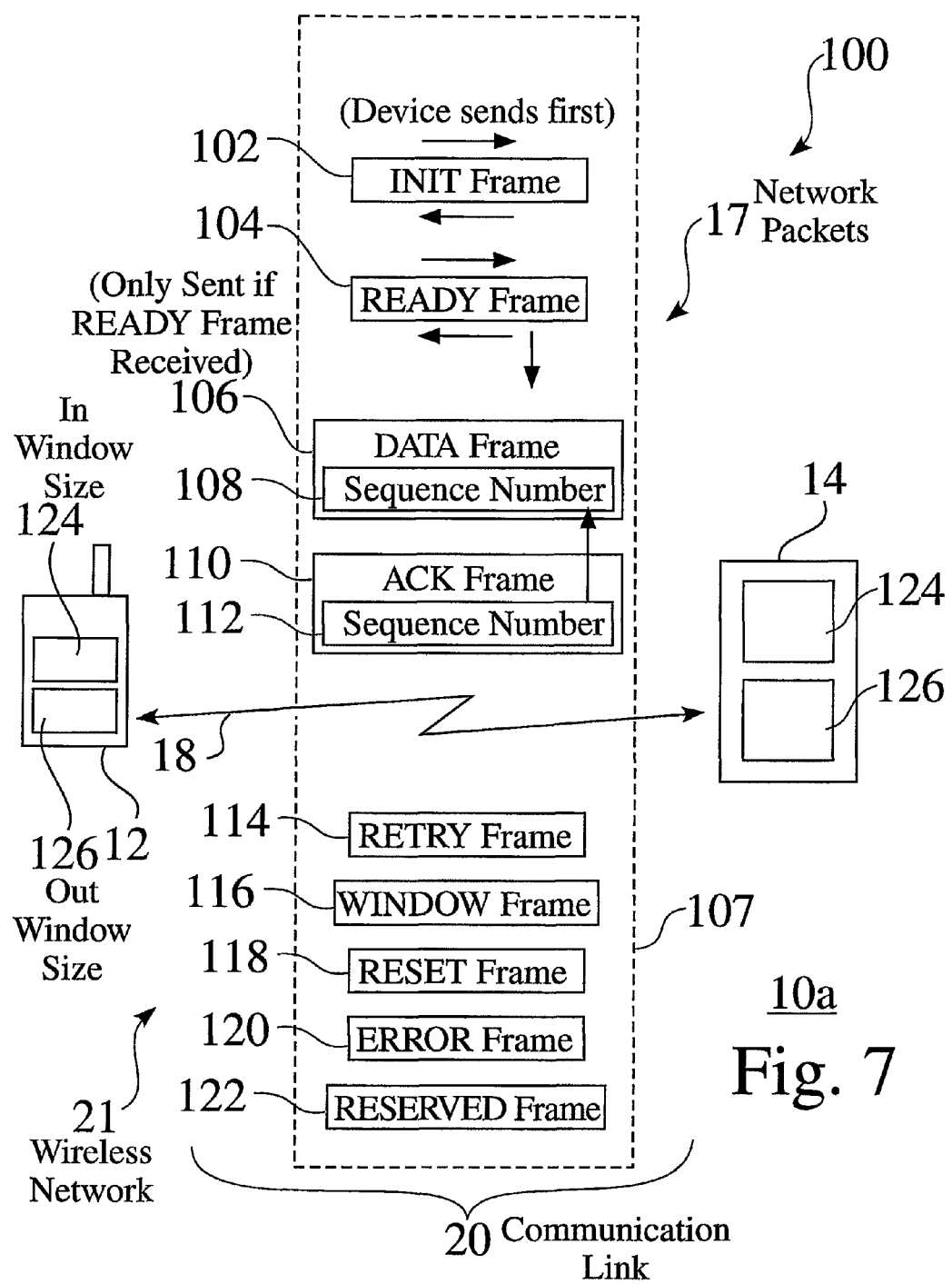
FIG. 7 is a schematic view of frame communication and asymmetric retry within a wireless device wireless datagram transaction protocol (WDTP) system.

FIG. 7 is a schematic view of a wireless datagram transaction protocol (WDTP) system 100, in which WDTP frames 101 are controllably exchanged between a wireless device 12 and a server 14, and comply with a wireless datagram transaction protocol 107. The WDTP frames 101 comprise INIT frames 102, READY frames 104, DATA frames 106, acknowledgement ACK frames 110, RETRY frames 114, WINDOW frames 116, RESET frames 118, and ERROR frames 120, as well as supplementary RESERVED frames 122. The wireless datagram transaction protocol system 100 provides sequencing, delivery acknowledgement 110 and throttling, i.e. through a sliding window 124,126 of datagram packets 17 carried over a network layer 21, and advantageously provides asymmetric retry within a wireless device wireless datagram transaction protocol (WDTP) system, such that stored power resources of a wireless device are conserved.

Uses for Wireless Datagram Transaction Protocol (WDTP). The wireless datagram transaction protocol system 100 provides sequencing, delivery acknowledgement and throttling of datagram packets 17 carried over a network layer 21, that typically provides a moderate level of error checking such as UDP and SMS. WDTP DATA frames 106 are typically used to carry an ordered stream of data 180 (FIG. 12), or arbitrarily ordered data 180.

To support devices with limited battery resources 54,56, the wireless datagram transaction protocol system 100 incorporates asymmetric retry logic that minimizes the transmissions required by the device 12. Typical embodiments of the wireless datagram transaction protocol system 100 provide communication over a wireless network, such as GPRS or 1xRTT.

While the wireless datagram transaction protocol system 100 is typically implemented for device-server communications, device-device communications are still possible with this protocol, such as for embodiments in which asymmetrical retry logic may be beneficial. For example, in communications systems between wireless devices having limited battery resources, an initial handshake between devices can preferably include a comparison of available power 54,56, whereby the direction of asymmetric logic can be determined to preserve power for the device having the lowest power capacity 54,56.

Error Recovery. WDTP uses validity checking based on the frame type 101, to catch most protocol errors that slip through the network layer's error checking. There are no "fatal" protocol errors that cause the WDTP connection to be dropped. Severe protocol errors will induce a reset process 118. Minor protocol errors are mostly ignored, i.e. when a minor protocol error is detected, the error is typically discarded, with no error message passed to higher layers of controlling software. Recovery from packet loss as a result of minor protocol errors is accomplished with retry mechanisms 114,116. WDTP recovers 100 from network layer errors with the same retry mechanisms used to recover from minor protocol errors.

Basic Approach to Frame Delivery. WDTP 100 requires that each DATA frame 106 carrying data eventually be acknowledged. However, the sender of a data-bearing frame 106 does not need to wait for one to be acknowledged before sending the next, such that many DATA frames 106 can be "in flight" at once. The size of the window (number of data frames that can be sent at once) is set during an initialization handshake. Lost data and acknowledgement frames are sent by a retry mechanism.

Datagram Layers.

Unique Device Identification. Communications layers below WDTP are able to uniquely identify the source of a datagram 19, so that the contents of a datagram 19 are delivered to the right destination. While source identification is often achieved with an IP address, in a wireless environment, such as GPRS, the IP address assigned to a device may change from time to time, possibly during the same online session.

Therefore, a wireless device 12 must be uniquely identified by something other than IP address. SMS datagrams provide this unique identifier in the SMS header; it is the MS-ISDN. UDP datagrams do not carry anything to uniquely identify the source other than the IP address. Thus, for UDP, there must be another protocol layer above UDP, but below WDTP, to carry a unique identifier, as shown:

<IP><UDP><Unique-ID Protocol><WDTP+data>. (1)

Replying to the Device. In the SMS case, the server 14 replies to the device 12 by sending a reply SMS to the source MS-ISDN. In the UDP case, wherein the internet routing protocol does not include an identifier that is guaranteed to be unique, the server 14 relies on the source IP address and port of the last UDP 15 (FIG. 1) received from the device 12, wherein the source IP address and port are contained in the IP layer of the protocol. Therefore, since the source IP address may change arbitrarily, the server 14 saves the source IP address and port each time a valid UDP 15 is received. If the source IP address changes, the server does not know, whereby any UDP datagrams sent by the server 19 would be sent to the wrong IP address, until the device sends another datagram 19.

Importance of Encryption. The SMS network layer guarantees that the MS-ISDN contained in the SMS header is authentic, i.e. that the SMS really came from the device 12 it says it came from. This is not true for the Unique-ID Protocol. Unless the Unique-ID protocol is encrypted, any device 12 can send a UDP with another Device's unique identifier. The server 14 would then save the wrong Device's IP address and start sending replies to the wrong Device. Unfortunately, encrypting the Unique-ID Protocol requires gateway servers to maintain encryption state. To avoid that requirement, it is sufficient to encrypt the WDTP frames.

<IP><UDP><Unique-ID Protocol><Encryption Protocol><encrypted(WDTP+data)> (2)

or, less secure but more efficient in terms of number of bytes (since not all WDTP frames contain data):

<IP><UDP><Unique-ID Protocol><WDTP+encrypted data> (3)

The server can then ignore any datagrams which fail to decrypt properly, not even updating the source IP and port.

Figure 9:
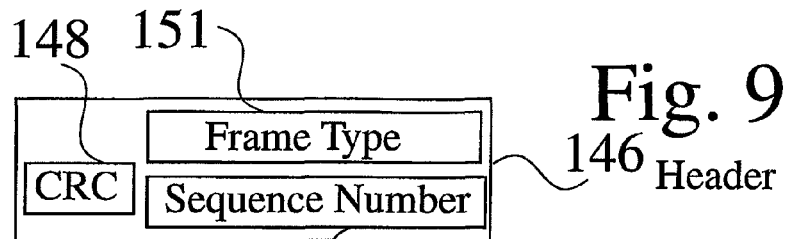
FIG. 9 is a schematic view of a frame header in the wireless datagram transaction protocol system.

Header Format. FIG. 9 is a schematic view of a frame header 146 in the wireless datagram transaction protocol system 100, comprising a CRC 148, a frame type identifier 151, and a sequence number identifier 153. The total size of the header 146 is typically four bytes, as shown:

$$< \underset{\text{2 bytes}}{\text{16-bit } CRC} > < \underset{\text{2 bytes}}{\text{frame type:sequence number}} > \quad (4)$$

The frame type identifier 151 and sequence number identifier 153 are typically stored within 2 bytes, wherein the first four bits determine frame type 151, and the remaining twelve bits identify 153 the sequence number (0 . . . 4095=0x0FFF). A 16-bit CRC 148 uses a standard CRC-16 polynomial: $x^{16}$+ $x^{15}$+$x^2$+1, which is different from the 16-bit CRC-CCITT polynomial. The CRC 148 is computed over the frame type, sequence number, and payload of the frame.

The wireless datagram transaction protocol system 100 seen in FIG. 7 presently comprises eight WDTP frame types 101, comprising INIT frames 102, READY frames 104, DATA frames 106, acknowledgement ACK frames 110, RETRY frames, 114, WINDOW frames 116, RESET frames 118, and ERROR frames 120. Supplementary RESERVED frames 122 are also provided in some embodiments of the wireless datagram transaction protocol system 100, to provide further system functionality. An overview of WDTP frame types is seen in Table 1.

TABLE 1

| Frame type | 4-bit encoding | Frame size (including payload) |
|---|---|---|
| INIT | 0000 | 8 bytes |
| READY | 0001 | 6 bytes |
| DATA | 0010 | >6 bytes (variable) |
| ACK | 0011 | 6 bytes |

TABLE 1-continued

| Frame type | 4-bit encoding | Frame size (including payload) |
|---|---|---|
| RETRY | 0100 | 12 bytes |
| WINDOW | 0101 | 4 bytes |
| RESET | 0110 | 6 bytes |
| ERROR | 0111 | 6 bytes |
| <Reserved> | 1000 . . . 1111 | |

Figure 8:
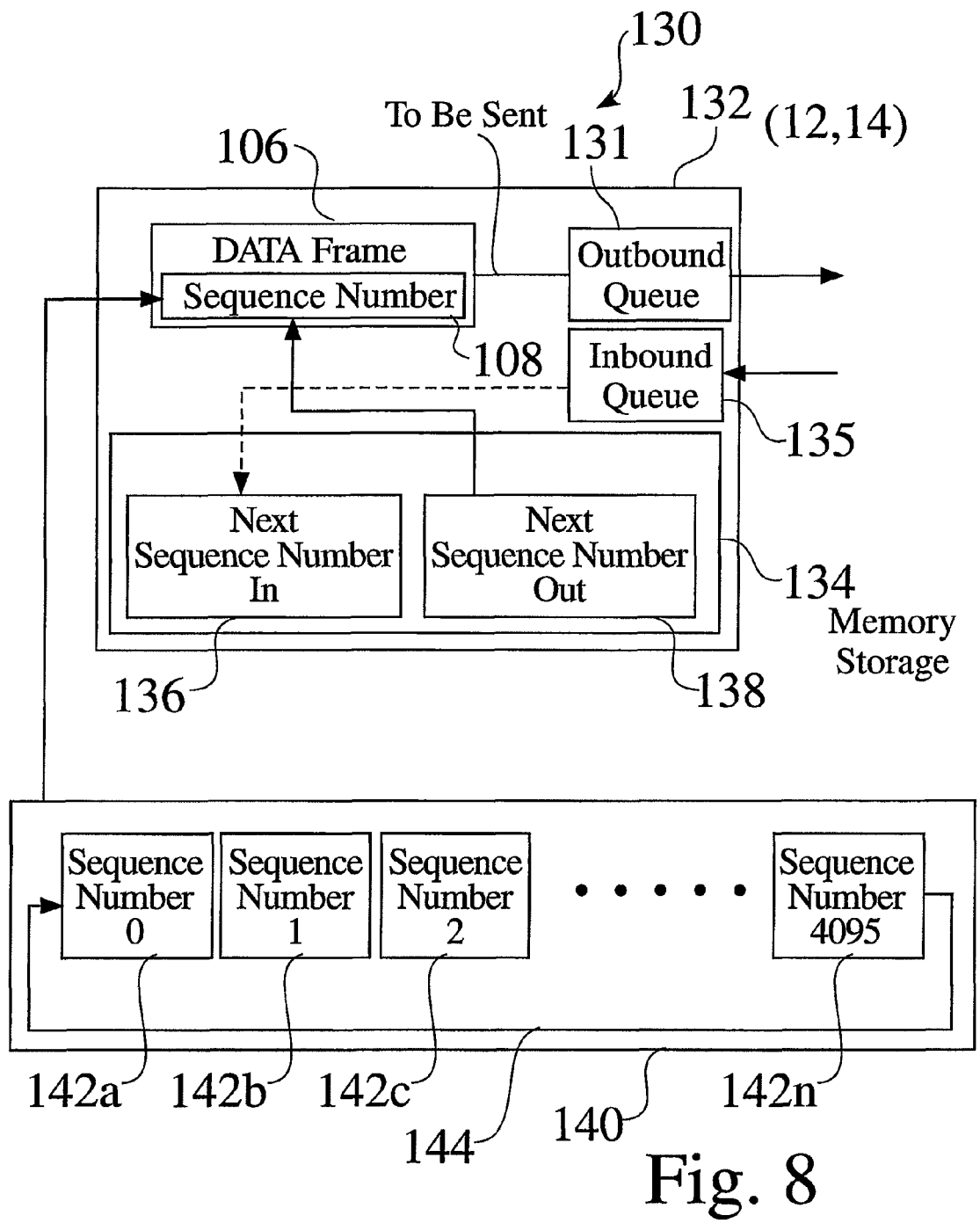
FIG. 8 is a schematic view of DATA frame sequence number processing and a wrapped sequence number series.

Sequence Number. FIG. 8 is a schematic view of DATA frame sequence number processing 130 and a wrapped sequence number series 140. In some embodiments of the wireless datagram transaction protocol system 100, the associated sequence number 108 for a DATA frame 106 is in the range from sequence number 0 142a to sequence number 4095 142n, and simply wraps around 144, which can be used in embodiments wherein there are no more than 4K of DATA frames 106 buffered. In embodiments of the wireless datagram transaction protocol system 100 having a maximum buffer window size of 1024 DATA frames 106, a wrapped sequence number series 140 having 0 . . . 4095 sequence numbers 142a-142n is more than sufficient.

The sequence number field 108,112 (FIG. 7) in the header 146 (FIG. 9) is used for different purposes, depending on the frame type 101. Only DATA frames 106 are actually sequenced. Thus, only DATA frames 106 have an assigned sequence number 176 (FIG. 12), i.e. assigned to them. The sequence number 153 in the header 146 of a DATA frame 106 truly is that frame's sequence number 176. In most other frame types 101 that are not sequenced, the sequence number 153 indicates which DATA frame 106 to act upon. For example, the sequence number 153,112 in an ACK frame 110 indicates which DATA frame 106 is being acknowledged.

Frame Formats.

Figure 10:
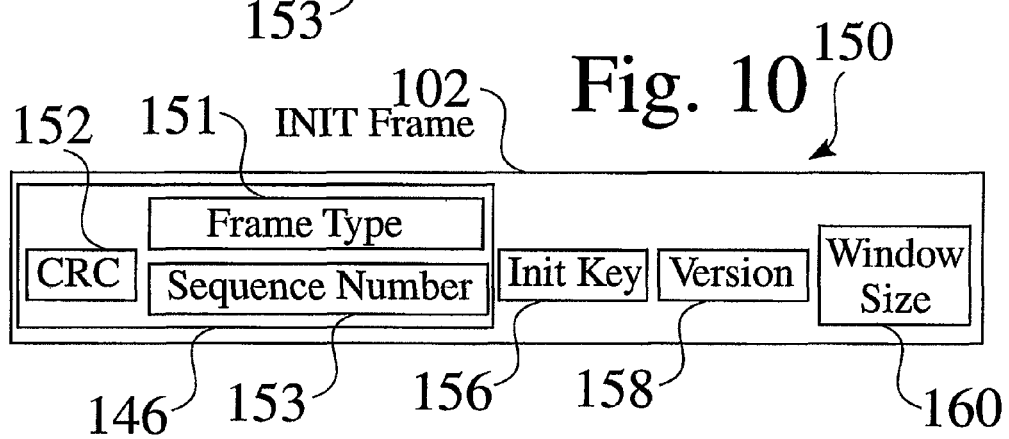
FIG. 10 is a schematic view of an INIT frame in the wireless datagram transaction protocol system.

INIT Frame. FIG. 10 is a schematic view 150 of an INIT frame 102 in the wireless datagram transaction protocol system 100. A header 146 comprises a CRC 152, a frame type identifier 151, and a sequence number 153.

The INIT frame 102 also comprises an init_key 156, a version number ID 158, and a window_size identifier 160, as shown:

<crc><0000:
    seqnum><init_key><version><window_size>     (5)

The relative size of the INIT frame 102 elements is shown in Table 2. A valid INIT frame 102 typically comprises 8 bytes.

TABLE 2

| crc | 2 bytes | CRC of the frame |
|---|---|---|
| seqnum | 12 bits | sequence number of the next DATA frame |
| init_key | 2 bytes | used to ensure INIT frames match |
| version | 1 byte | protocol version number |
| window_size | 1 byte | in_window_size of the sender of this frame |

An INIT frame 102 is sent by each side, e.g. by both a wireless device 12 and a server 14, to exchange starting sequence numbers 153, and to set the window size for throttling DATA frames 106. The device 12 is responsible for sending (and resending upon a timeout) the first INIT frame 102. DATA frames 106 are not sent until the sender is notified that its INIT frame 102 has been received, whereby notification of receipt is accomplished with the transmittal and receipt of a READY frame 104. In typical system embodiments between a wireless device 12 and a stationary server 14, communication is prompted by action of the wireless device 12, i.e. the server 14 never sends the first INIT frame 102.

Once the initialization sequence is complete, it is an error for the server 14 to receive an INIT frame 102 from the device 12, whereby the server 12 would properly reply with an ERROR frame 120 (FIG. 7). Prior to completion of the initialization sequence, wherein READY frames 104 are exchanged, the server 104 must always reply with its own INIT frame 102 each time it receives an INIT frame 102 from the device 12.

INIT Frame seqnum field. The sequence number field 153 in the header 146 specifies the sequence number 176 of the next DATA frame 104 that will be sent. The sender may initialize this value arbitrarily in the range {0 . . . 4095}, and store it in a variable called next_seqnum_out 138 (FIG. 8).

When an INIT frame 102 is received, the receiver stores its sequence number 153 in a variable called next_seqnum_in 136. The next DATA frame 106 to be received is expected to have a sequence number of next_seqnum_in 136.

INIT Frame init_key field. The device 12 computes the init_key 156 arbitrarily before sending its INIT frame 102 to the server 14, and server 14 uses the same init_key 156 in its reply INIT frame 102. If the device 12 times out waiting for the server's reply INIT frame 102, the device computes a new and different init_key 156 before resending its INIT frame 102 to the server 14.

INIT Frame version field. The INIT frame version field 158 is used to confirm the version of the protocol system 100. For example, in a current version 158 of the Wireless datagram transaction protocol system 100, the version field 158 is set to {1}. The version number is incremented, as necessary, based upon modification of the Wireless datagram transaction protocol system 100.

If a device 12 sends an INIT frame 102 with a version 158 that is not supported by the server 14, the server 14 preferably responds to indicate that the requested version of the protocol is not supported. For example, the server 14 may respond with an INIT frame having the version 158 set to 0, wherein a version 158 set to 0 indicates that the requested version of the protocol is not supported.

INIT Frame window_size field. As seen in FIG. 7, both the server 14 and the device 12 have variables called in_window_size 124 and out_window_size 126. These variables 124,126 are used for determining whether the 'window is open' to transmit an outbound DATA frame 106, and to validate the associated sequence number 108 of an inbound DATA frame 106.

The window_size field 160 in the INIT frame 102 is in the range {0 . . . 255}, but it is multiplied by 4 to obtain the actual window size. The special value 0 indicates a window of 1024 frames.

The sender, e.g. a device 12 or server 14, of an INIT frame 102 sets the window_size field 160 to its own in_window_size 124. The receiver of an INIT frame 102 sets its out_window_size 126 equal to the window_size field 160 in the INIT frame 102. Table 3 summarizes the use of in_window_size 124 and out_window_size 126 fields.

TABLE 3

| Variable | Definition |
|---|---|
| Device::in_window_size | maximum number of inbound DATA frames that can be buffered by the Device |
| Device::out_window_size | maximum number of inbound DATA frames that can be buffered by the Server |

TABLE 3-continued

| Variable | Definition |
| --- | --- |
| Server::in_window_size | maximum number of inbound DATA frames that can be buffered by the Server |
| Server::out_window_size | maximum number of inbound DATA frames that can be buffered by the Device. |

Table 4 summarizes the logic states for the device 12 and server 14 after the INIT frames 102 have been exchanged, i.e. the following states should be true:

TABLE 4

| Server | | Device |
| --- | --- | --- |
| next_seqnum_in | equals | next_seqnum_out |
| next_seqnum_out | equals | next_seqnum_in |
| in_window_size | equals | out_window_size |
| out_window_size | equals | in_window_size |

Figure 11:
FIG. 11 is a schematic view of a READY frame in the wireless datagram transaction protocol system.

Ready Frames. FIG. 11 is a schematic view 162 of a READY frame 104 in the wireless datagram transaction protocol system 100. A READY frame 104 is sent to acknowledge receipt of the INIT frame 102, and to establish the Reset Key 166. No DATA frames 106 are sent until a READY frame 104 is received. The READY frame 104 comprises a CRC 164 and a reset key 166, wherein the reset key 166 is comprised of a reset_key_A 168 and a rest_key_B 170, as shown:

$$<crc><0001:reset\_key\_a><reset\_key\_b> \quad (6)$$

The relative size of the READY frame 104 elements is shown in Table 5. A valid INIT frame 102 typically comprises six bytes.

TABLE 5

| crc | 2 bytes | CRC of the frame |
| --- | --- | --- |
| reset_key_a | 12 bits | part of first 2 bytes of the reset key |
| reset_key_b | 2 bytes | last 2 bytes of the reset key |

The device 12 is responsible for timing out and resending a READY frame 104, in a similar manner to the communication of INIT frames 102. Any time the server 14 receives a READY frame 104, the server 14 properly replies with an identical READY frame 104. In most embodiments of the Wireless datagram transaction protocol system 100, since the ready state is initiated by the device, the device 12 does not properly reply to a received READY frame 104.

If the device 12 receives a DATA frame 106 when it is expecting a READY frame 104, the device may assume that the server 14 received the device's READY frame 104. The READY frame 104 from the server 12 may come later, or may never arrive. In either case, the device 12 does not need to resend its READY frame 104.

READY Frame Reset Key. The Reset Key 166 typically comprises a 28 bit value, with a range of 0 . . . 256M. The Reset Key 166 is also sent as part of a RESET frame 118, if a RESET frame 118 ever becomes necessary. The purpose of the Reset Key 166 is to verify that the sender of a RESET frame 118 is actually the owner of the WDTP connection.

The device 12 computes the Reset Key 166 arbitrarily at the beginning of the initialization process. If the READY frame 104 must be resent because of a timeout, the Reset Key is not recomputed. Both the device 12 and the server 14 store the Reset Key 166 as part of the connection information.

READY Frame reset_key_a field and reset_key_b field. The reset_key_a field 168 holds the first 12 bits of the Reset Key 166, while the reset_key_b field 170 holds the last 2 bytes of the Reset Key 166.

READY Frame Validation Check. In one embodiment of the Wireless datagram transaction protocol system 100, a valid READY frame 104 always has exactly 6 bytes, such that the device 12 can compare a READY frame 104 it receives from the server 14 to a READY frame 104 which was sent to the server, to confirm the validity of the received READY frame 104.

Figure 12:
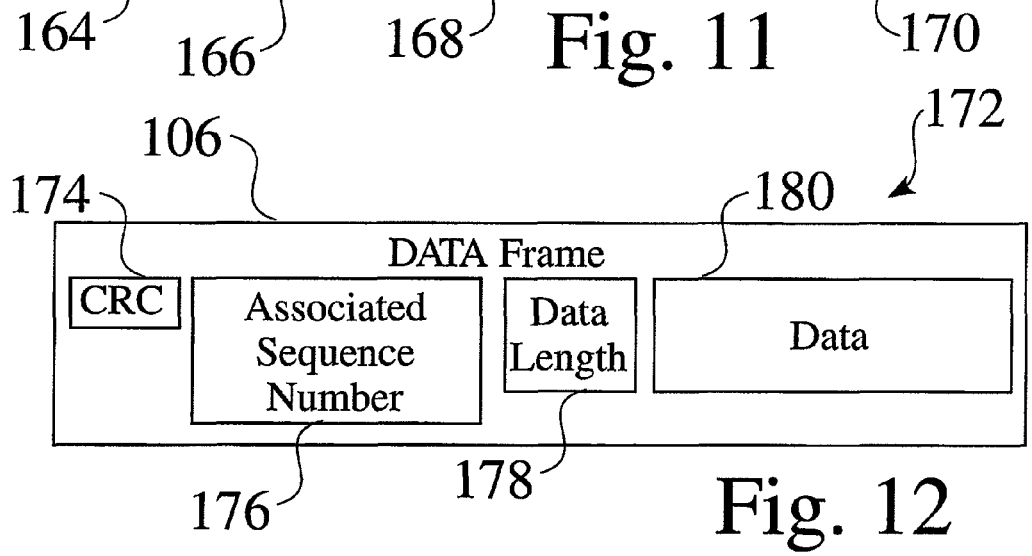
FIG. 12 is a detailed schematic view of a DATA frame in the wireless datagram transaction protocol system.

Data Frames. FIG. 12 is a schematic view of a DATA frame 106 in the wireless datagram transaction protocol system, comprising a CRC 174, and associated sequence number 176, a data length 178, and data 180, as shown:

$$<crc><0010:seqnum><data\_length><data> \quad (7)$$

A DATA frame 106 is only sent after the initialization process is complete. If the server receives a DATA frame 106 before initialization has started, the server 14 replies with an ERROR frame 120. If the server 14 receives a DATA frame 106 during initialization, the server 14 ignores the frame 106. Similarly, if the device 12 receives a DATA frame 106 before or during initialization, the device 12 ignores the frame 106. The relative size of the DATA frame 104 elements is shown in Table 6.

TABLE 6

| crc | 2 bytes | CRC of the frame |
| --- | --- | --- |
| seqnum | 12 bits | the sequence number of this DATA frame |
| data_length | 2 bytes | the number of bytes in the data field |
| data | n bytes | the data |

Data Frame seqnum field. The sender of a DATA frame 106 sets the seqnum field 176 to the next number in the sequence. The next_seqnum_out variable 138 (FIG. 8) is not incremented until a DATA frame 106 is actually sent.

Data Frame data_length field. In one embodiment of the wireless datagram transaction protocol system 100, the maximum amount of data that can be carried by a DATA frame 106 is 64K bytes. In alternate embodiments of the Wireless datagram transaction protocol system 100, the datagram protocol which is used to transport a DATA frame 106 limits the amount of data per DATA frame to an amount less than 64K bytes. For example, UDP has a maximum size of 1536 data bytes, although some implementations only allow 1024 data bytes. Thus, the maximum data size for a DATA frame 106 transported via UDP is 1018 bytes (1024 minus 6 bytes of header).

Data Frame data field. The data field 180 contains 'data_length' bytes of the stream being transmitted. A wide variety of data types can be used, such as but not limited to 7-bit data, 8-bit data, encrypted data, or non-encrypted data.

Data Frame Processing. When a DATA frame 106 is received that is within the window of valid sequence numbers 176, but is not the next_seqnum_in 136 expected, the receiver must add the DATA frame 106 to its inbound queue 135 and keep track of which DATA frames 106 are missing. Since DATA frames 106 are processed in sequential order, DATA frames 106 which are received out of order must be held in queue 135 until the missing DATA frames 106 are received. One way to accomplish this is to add empty DATA frames to the inbound queue to fill in the holes. The state of an empty DATA frame can be set to "missing". As the missing DATA frames arrive, simply replace the "missing" placeholder with the real DATA frame and set its state to "ready".

Data Frame Validation Check. In a current embodiment of the Wireless datagram transaction protocol system 100, the total size of a valid DATA frame is always be greater than 6 bytes, and the total size of a valid DATA frame 106 should be equal to data_length+6.

Figure 13:
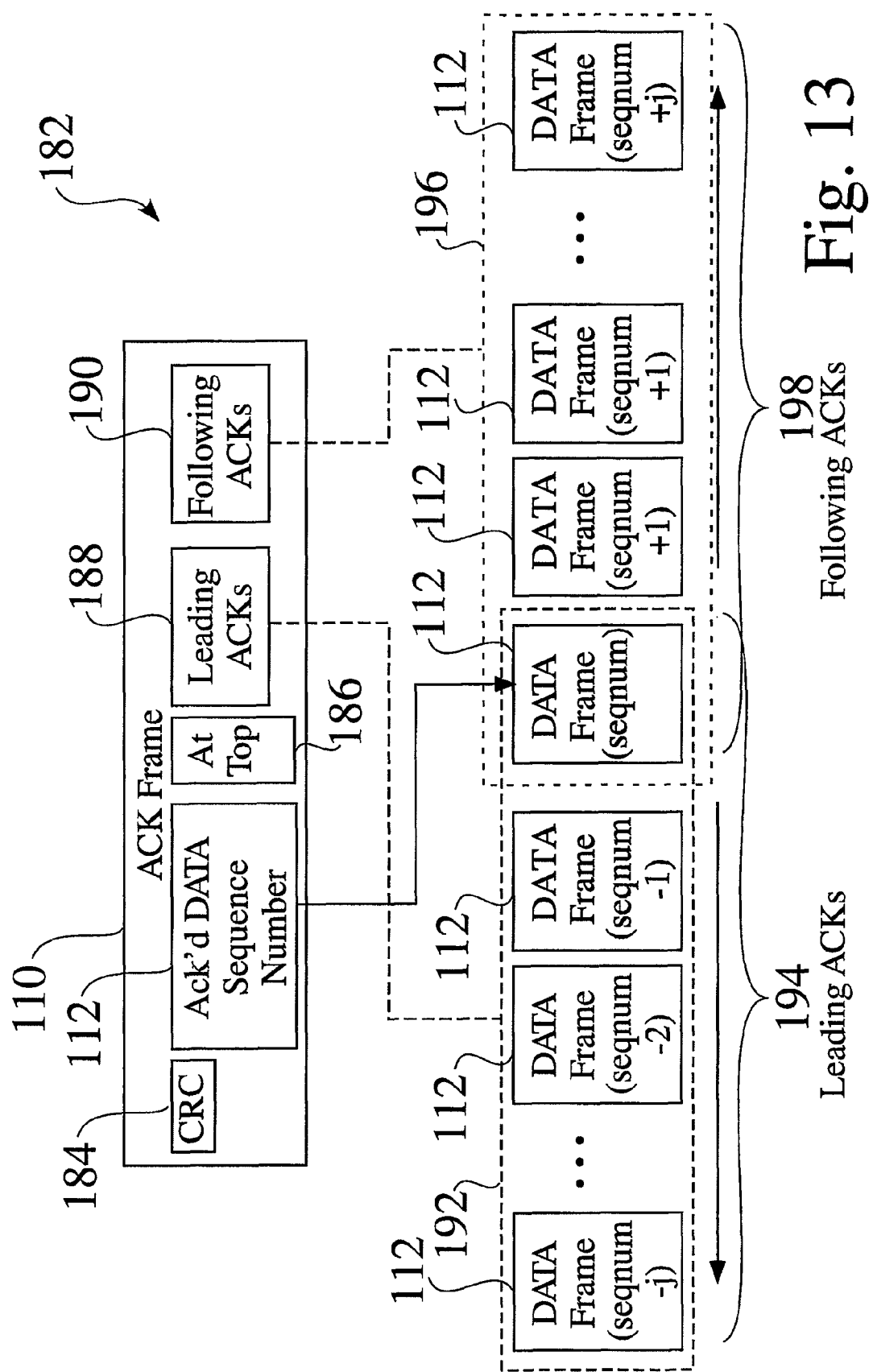
FIG. 13 shows a detailed schematic view of an acknowledgement ACK frame in the wireless datagram transaction protocol system.

ACK Frames. FIG. 13 shows a schematic view 182 of an acknowledgement ACK frame 110, comprising an ACK frame CRC 184, an acknowledged sequence number 112, an at top field 186, a leading ACKs field 188, and a following ACKs field 190, as shown:

<crc><0011:seqnum><at_top:
   leading_acks><following_acks>          (8)

An ACK frame 110 is sent by a recipient, such as a device 12 or a server 14, in response to each DATA frame 106 received. No other frame types 101 are acknowledged by an ACK frame 110. As soon as an ACK frame 110 is received, the DATA frame 106 with the matching sequence number 108 may be deleted from the outbound queue 131 (FIG. 8). The relative sizes of exemplary ACK frame elements are shown in Table 6.

TABLE 7

| CRC | 2 bytes | CRC of the frame |
|---|---|---|
| Seqnum | 12 bits | the sequence no. of the DATA frame recd, now being ACK'd |
| at_top | 1 bit | Boolean: true if there are no "missing" DATA frames prior to the DATA frame being ACK'd |
| leading_acks | 7 bits | number of received DATA frames preceding and contiguous to seqnum |
| following_acks | 8 bits | number of received DATA frames following and contiguous to seqnum |

"Overlapping" ACK frames. Preferred embodiments of the wireless data protocol system 100 comprise an overlap of ACK frames 110 for a recipient, such as for a wireless device 12 or a server 14. The overlap of ACK frames 110 helps compensate for lost ACK frames 110. As seen in FIG. 13, a leading_acks field 188 and a following_acks_field 190 are counts of the number of DATA frames 106 actually received (state="ready") in the inbound queue 135 that reside immediately prior to and immediately after the DATA frame 106 being ACK'd, causing ACK frames 110 to "overlap" each other.

The leading_acks field 188 and the following_acks_field 190, together with the at_top field 186, allow a receiver of the ACK frame 110 to deduce information about which of its DATA frames 106 have actually been received on the other end. The receiver of an ACK frame 110 does not use the overlap information to send a RETRY frame 114 or WINDOW frame 116, or to reset a timer waiting for a still pending ACK 110. The correct response is simply to use the information as supplemental ACK's and remove corresponding DATA frames 106 from the outbound queue 131.

The counting of contiguous DATA frames 106 that have actually been received is not a significant burden on the device 12, since the inbound queue 135 is usually small.

ACK Frame seqnum field. The sequence number 112 of the ACK frame 110 is set to the sequence number 108 of the DATA frame 106 being ACK'd.

ACK Frame at_top. The at_top field 186 is set to true if there are no "missing" DATA frames 106 in the inbound queue 131 prior to the DATA frame 106 being ACK'd. Sometimes the leading_acks field 188 may not be large enough to count all the received DATA frames 106 prior to the DATA frame 106 being ACK'd. However, this condition does not affect the value of the at_top field 186. If the DATA frame 106 being ACK'd is the very first frame 106 in the inbound queue 131, at_top 186 is set to true.

ACK Frame leading_acks. The leading_acks field 188 can hold a value in the range 0 . . . 127. If there are more than 127 "ready" DATA frames 106 in the inbound queue immediately (and contiguously) prior to the DATA frame 106 being ACK'd, the leading_acks field 188 simply holds a value of {127}.

ACK Frame following_acks. The following_acks field 198 can hold a value in the range 0 . . . 255. If there are more than 255 "ready" DATA frames 106 in the inbound queue 135 immediately (and contiguously) following the DATA frame 106 being ACK'd, the following_acks field 190 simply holds a value of {255}.

ACK Frame Validation Check. An ACK frame 110 is typically a specific size, such that the receipt of an ACK frame 110 having a size different than that specified indicates a non-valid ACK frame 110. For example, in a current embodiment of the Wireless datagram transaction protocol system 100, a valid ACK frame has exactly 6 bytes.

Figure 14:
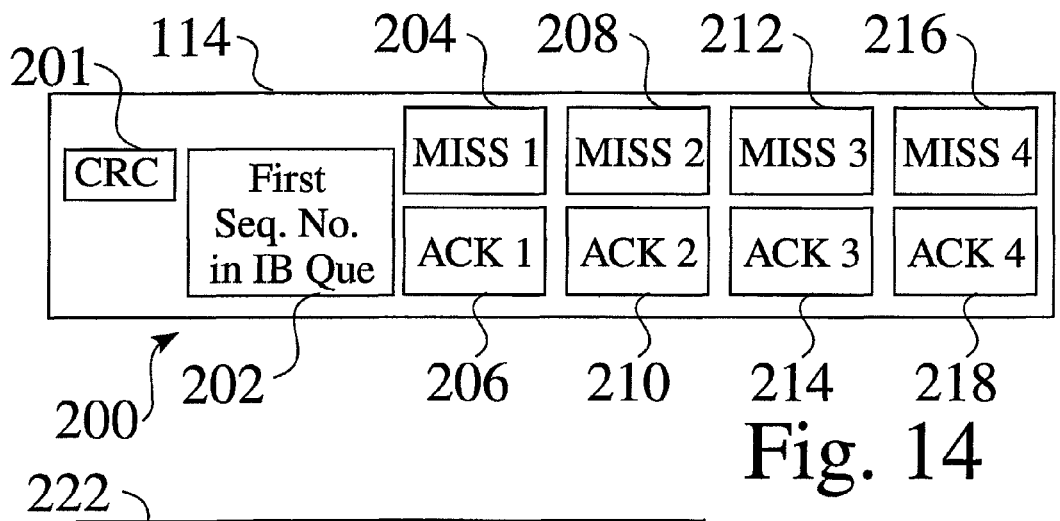
FIG. 14 is a detailed schematic view of a RETRY frame in the wireless datagram transaction protocol system.

Retry Frames. FIG. 14 is a schematic view of a RETRY frame 114, comprising a CRC 201, a First Sequence Number in Inbound Queue 202, a MISS 1 204, and ACK 1 206; a MISS 2 208, and ACK 2 210; a MISS 3 212, and ACK 3, 214; a MISS 4 216, and an ACK 4 218, as shown:

<crc><0100:
   seqnum><miss1><ack1><miss2><ack2><miss3><ack3><miss4><ack4>

A RETRY frame 114 specifies the sequence numbers 108 of DATA frames 106 that need to be resent, and also indicates which DATA frames 106 have already been received. A RETRY frame therefore provides a picture to a recipient of the state of the sender's inbound queue 135. The relative sizes of exemplary RETRY frame 114 elements are shown in Table 8.

TABLE 8

| crc | 2 bytes | CRC of the frame |
|---|---|---|
| seqnum | 12 bits | the sequence number that begins the run |
| miss1 | 1 byte | count of missing DATA frames starting with seqnum |
| ack1 | 1 byte | count of received DATA frames following miss1 |
| miss2 | 1 byte | count of missing DATA frames following ack1 |
| ack2 | 1 byte | count of received DATA frames following miss2 |
| miss3 | 1 byte | count of missing DATA frames following ack2 |
| ack3 | 1 byte | count of received DATA frames following miss3 |
| miss4 | 1 byte | count of missing DATA frames following ack3 |
| ack4 | 1 byte | count of received DATA frames following miss4 |

A receiver of DATA frames 106 can decide whether one or more DATA frames 106 missing, by keeping track of sequence numbers 108, as DATA frames 106 arrive, and by detecting gaps in the series of sequence numbers 108.

Retry Frame Server Retry Logic. The wireless datagram protocol system 100 comprises retry logic which is asymmetric between a server 14 and a device 12, which minimizes the transmissions required from the wireless device 12. Since transmitting 38 consumes more battery power 54,56 than receiving 40, the asymmetric retry logic conserves available battery power for the wireless device 12.

The server 14 sends a RETRY frame 114 to the device 12 for two reasons. In a first RETRY condition, the server 14 sends a RETRY frame 114 to the device 12 if the server receives a WINDOW frame 116 from the Device 12. In a second RETRY condition, the server 14 sends a RETRY frame 114 to the device 12 if the server 'times out' waiting for a missing DATA frame 106 from the device 12.

In the first retry condition, when the server 14 receives a WINDOW frame 116 from the device 12, the server 14 responds by sending one or more fully specified RETRY frames to the Device, wherein a "Fully specified" RETRY frame 114 includes filling in all the missX 204,208,212,216 and ackX fields 206,210,214,218. The intent of the fully specified RETRY frame 114 is to inform the device 12 of all DATA frames 106 whose state is "missing", regardless of how long the data frames 106 have been missing.

In the second retry condition, wherein the server 14 sends a RETRY frame 114 as a result of timing out while waiting for a missing DATA frame 106, the sent RETRY frame 114 is not necessarily "fully specified." In the second retry condition, the server 14 sends one or more RETRY frames 114 to the device 12, specifying only those DATA frames 114 that have been missing for at least N seconds, wherein N is preferably host configurable. A specified time greater than or equal to N helps to avoid asking the device 12 to resend a DATA frame 106 that is already in flight to the server 14. The server 14 typically checks for overdue DATA frames 106 in a periodic manner, e.g. every M seconds, wherein the period M is preferably host configurable.

The device 12 properly responds to a RETRY frame 114 by immediately resending outbound DATA frames 106 that are in the 'missing' ranges, and by removing DATA frames 106 from the outbound queue 131 that are in the 'ack' ranges. Care is taken when removing DATA frames 106 from the outbound queue 131, since some DATA frames may have already been removed as a result of a previous ACK frame 110.

Retry Frame Device Retry Logic. The device 12 only sends RETRY frames 114 to the server 14 in response to receiving a WINDOW frame 116. This way the device 12 doesn't continually send RETRY frames 114 until the server 12 finally receives one.

Upon receipt of a RETRY frame 114 from a device 12, the server 12 responds by immediately resending outbound DATA frames 106 that are in the 'missing' ranges, and by removing DATA frames 106 from the outbound queue 135 that are in the 'ack' ranges. Care is taken when removing DATA frames 106 from the outbound queue 131 of the server 14, since some DATA frames 106 may have already been removed as a result of a previous ACK frame 110.

Retry Frame Format. The format of the RETRY frame 114 specifies a starting sequence number 202 followed by a plurality of, e.g. eight, run lengths 202-218. In FIG. 14, the eight run lengths indicate the number of DATA frames 106 that are: missing 204, received 206, missing 208, received 210, missing 212, received 214, missing 216, and received 218. In one exemplary embodiment of the Wireless datagram transaction protocol system 100, wherein run lengths are 1-byte values, and wherein only eight runs may be specified, a single RETRY frame 114 may be insufficient to specify the state of the entire inbound queue 135, wherein an inbound queue may be as large as 1024 frames. Therefore, multiple RETRY frames 114 may be required to fully specify the state of the entire inbound queue 135.

In a typical embodiment of the Wireless datagram transaction protocol system 100, missing DATA frames 106 are generally clumped together. The plurality of runs 204-218 within a REPLY frame 114 reduces the number of RETRY frames 114 required to fully specify the state of the entire inbound queue 135. While eight runs are specified in one embodiment of the Wireless datagram transaction protocol system 10, the number of runs 204-218 may alternatively be tuned to a different number, such as based upon practice, to minimize the overhead required to recover from packet loss.

Retry Frame seqnum field. The seqnum field 202 of a RETRY frame 114 contains the sequence number of the first frame in the inbound queue 135.

Retry Frame MISS fields and ACK fields. The miss1 field 204 is the count of how many DATA frames 106 are missing, beginning with seqnum 202. The ack1 field 206 is the count of how many DATA frames 106 have been received following the run of missing DATA frames 106 specified by miss1 204. Similarly, miss2 208, ack2 210, miss3 212, ack3 214, miss4 216, and ack4 218 fields comprise the count of how many DATA frames 106 are in alternating runs of missing and received DATA frames 106 following the ack1 run 206. Some examples for unusual cases are presented, as shown:

RETRY Frame Example A. The inbound queue 135 starts with five frames 106 ready to be processed, then 3 missing frames. The first frame has a sequence number=14:

$$<crc><RETRY:14><0><5><3><0><0><0><0><0> \quad (10)$$

RETRY Frame Example B. The inbound queue 135 is empty, next_seqnum_in=103:

$$<crc><RETRY:103><0><0><0><0><0><0><0><0> \quad (11)$$

RETRY Frame Example C. The inbound queue 135 has 500 missing frames 106, followed by 300 frames ready for processing. The first frame has a sequence number=951:

$$<crc><RETRY:951><255><0><245><255><0><45><0><0> \quad (12)$$

RETRY Frame Example D. The inbound queue 135 has 11 frames, alternating missing and ready every other frame. The first frame has a sequence number=20:

$$<crc><RETRY:20><1><1><1><1><1><1><1><1> \quad (13)$$

$$<crc><RETRY:28><1><1><1><0><0><0><0><0>$$

Retry Frame Validation Check. A RETRY frame 114 is typically a specific size, such that the receipt of a RETRY frame 114 having a size different than that specified indicates a non-valid RETRY frame 114. For example, in a current embodiment of the Wireless datagram transaction protocol system 100, a valid RETRY frame has exactly 12 bytes.

Figure 15:
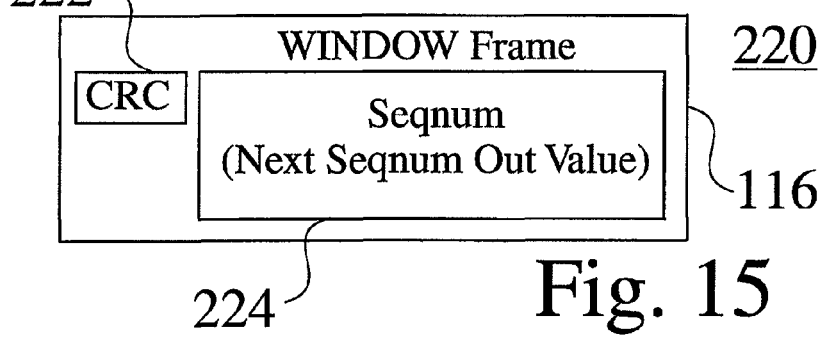
FIG. 15 is a detailed schematic view of a WINDOW frame in the wireless datagram transaction protocol system.

Window Frames. FIG. 15 is a schematic view 220 of a WINDOW frame 116, comprising a window frame CRC 222, and a window frame seqnum 224, as shown:

$$<crc><0101:seqnum> \quad (14)$$

In current embodiments of the Wireless datagram transaction protocol system 100, a WINDOW frame 116 is only sent when there is a suspicion that a DATA frame 106 has not been received. The receiver, e.g. a device 12 or server 14, of a WINDOW frame 116 has enough information to compute the window from the perspective of the sender (more accurately, what the sender would like the window to be). The receiver responds to a WINDOW frame 116 by sending one or more RETRY frames 114 to get the window back in sync. The relative sizes of exemplary WINDOW frame 116 elements are shown in Table 9.

TABLE 9

| crc | 2 bytes | CRC of the frame |
|---|---|---|
| seqnum | 12 bits | the next_seqnum_out value |

The logic for sending a WINDOW frame 116 is asymmetric between the server 14 and the device 12, thereby minimizing the transmissions required from the wireless device 12. Since the transmission of a forward link signal 38 consumes more battery power 56 than the receipt of a reverse link signal 40, the asymmetric WINDOW frame logic serves to minimize battery consumption for a device 12 having limited power resources 54,56.

Window Frame Server logic. The server 14 sends a WINDOW frame 116 if any DATA frame 106 the server 14 has sent is not ACK'd within a specified time period, e.g. N seconds. The server 14 typically checks periodically for overdue ACK's, e.g. every M seconds.

Window Frame Device logic. The device 12 sends a WINDOW frame 116 only when it has timed out waiting for the window 254 to open. The device 12 must start a timer 281 when the device 12 attempts to send a DATA frame 106, but is unsuccessful on a condition when the window is closed. Events which are used to clear the window-closed timer are

- receiving an ACK (or overlapping ACK) frame 110 for the very first DATA frame 106 in the outbound queue 131; or
- receiving a RETRY frame 114 that allows the device 12 to implicitly ACK the very first DATA frame 106 in the outbound queue 131.

When the device 12 sends the WINDOW frame 116, the device 12 restarts the timer 281.

The device 12 relies on the server 14 to send RETRY frames 114 for DATA frames 106 which the server 14 is missing. However, the server 14 has no way of knowing if the last DATA frame 106 sent by the device 12 never arrived. If the DATA frames 106 on the end of the device outbound queue 131 stack up, the window 254 may become closed, which is detectable only by the device 12.

Window Frame seqnum field. The seqnum field contains sequence number of the sender's first outbound DATA frame whose state is "waitingForWindow", if there is one. Otherwise, this field contains the current value of the sender's next_seqnum_out field.

Window Frame Validation Check. As described above for other WDTP frames 101, a WINDOW frame 116 is typically a specific size, such that the receipt of an WINDOW frame 116 having a size different than that specified indicates a non-valid WINDOW frame 116. For example, in a current embodiment of the Wireless datagram transaction protocol system 100, a valid WINDOW frame 116 has exactly 4 bytes.

Figure 16:
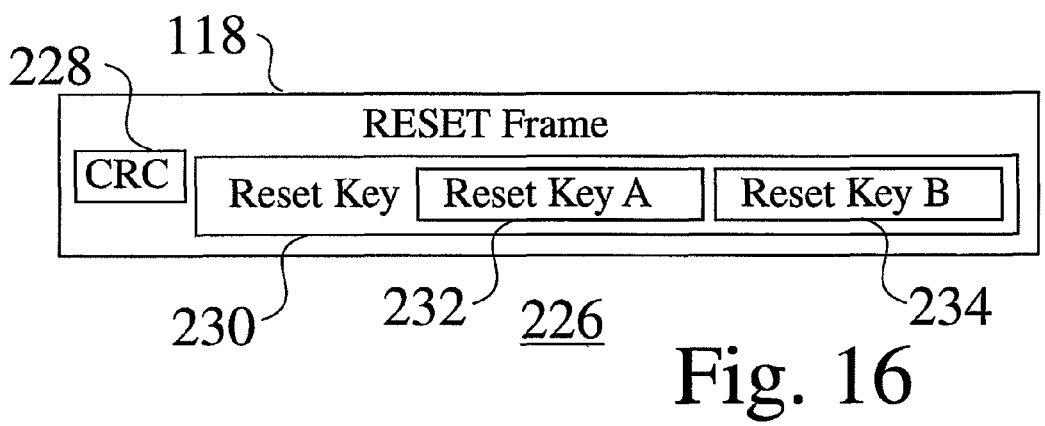
FIG. 16 is a detailed schematic view of a RESET frame in the wireless datagram transaction protocol system.

RESET frames. FIG. 16 is a detailed schematic view of a RESET frame 118, which comprises a reset CRC 228, and a reset key 230, which is comprised of a reset key A 232 and a rest key B 234, as shown:

$$<\text{crc}><0110:\text{reset\_key\_a}><\text{reset\_key\_b}> \quad (15)$$

The RESET frame 118 instructs the server 14 to reset its WDTP Manager 862 (FIG. 46), i.e. to purge all the queues 131,135, and return to the eWDTP_stopped state 492 (FIG. 30), whereby the server 14 will then be ready to receive an INIT frame 102 from the device 12. The relative sizes of exemplary RESET frame 118 elements are shown in Table 10.

TABLE 10

| crc | 2 bytes | CRC of the frame |
|---|---|---|
| reset_key_a | 12 bits | part of first 2 bytes of the reset key |
| reset_key_b | 2 bytes | last 2 bytes of the reset key |

Whenever the server 14 receives a RESET frame 118 from the device, the server 14 replies with an identical RESET frame 118, after verifying the authenticity of the Reset Key 230. The device 12, upon receipt of replying RESET frame 118 from the server, may then begin the INIT sequence.

In current embodiments of the Wireless datagram transaction protocol system 100, the server 14 never initiates the reset handshake. Therefore, the device 12 ignores a RESET frame 118, unless its WDTP state is eWDTP waitingForReset, which is the state of the device 12 upon initiating a reset handshake, i.e. sending a RESET frame 118 to the server 14.

Reset Frame Reset Key. The reset frame reset key 230 shown in FIG. 16 comprises a 3½ byte (28 bit) value that is initially computed by the device 12, and is transmitted to the server 12 in the READY frame 104. The reset_key_a field 232 holds the first 12 bits of the Reset Key 230. The reset_key_b field 234 holds the last 2 bytes of the Reset Key 230.

The purpose of the reset key 230 is to verify that the sender of a RESET frame 118 is actually the owner of the WDTP connection. When the server 14 receives a RESET frame 118, the server 14 compares the reset key 230 to the reset key 166 the server 14 received in the READY frame 104 during initialization. If the keys 230,166 don't match, the server 14 simply ignores the frame 118.

Reset Frame Validation Check. As described above for other WDTP frames 101, a RESET frame 118 is typically a specific size, such that the receipt of a RESET frame 118 having a size different than that specified size indicates a non-valid RESET frame 118. For example, in a current embodiment of the Wireless datagram transaction protocol system 100, a valid RESET frame 118 comprises exactly 6 bytes.

Figure 17:
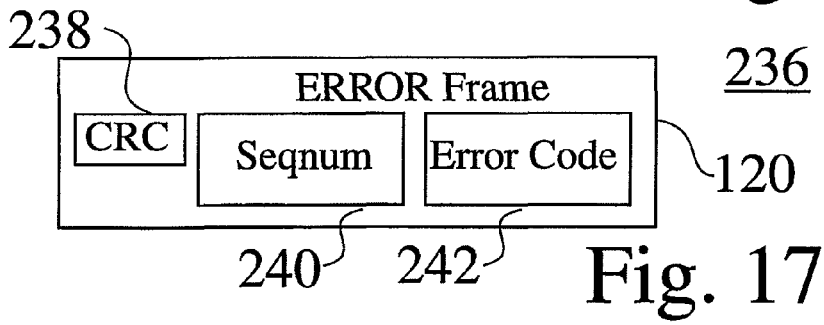
FIG. 17 is a detailed schematic view of an ERROR frame in the wireless datagram transaction protocol system.

ERROR frames. FIG. 17 is a detailed schematic view 236 of an ERROR frame 120, comprising an error frame CRC 238, an error frame sequence number (seqnum) 240, and an error frame error code 242, as shown:

$$<\text{crc}><0111:\text{seqnum}><\text{errcode}> \quad (16)$$

The relative sizes of exemplary ERROR frame 120 elements are shown in Table 11.

TABLE 11

| crc | 2 bytes | CRC of the frame |
|---|---|---|
| seqnum | 12 bits | set to 010101010101 (0x0555) for validation |
| errcode | 2 bytes | the error code |

In current embodiments of the Wireless datagram transaction protocol system 100, only the server 14 sends ERROR frames 120. The purpose of an ERROR frame 120 is to inform the device 12 that a severe protocol error has occurred. The response to an ERROR frame 120 from a device 12 depends on the error code 242. The seqnum field 240 is used to validate the ERROR frame 120, and is typically set to a value which signifies an error condition, e.g. such as a value 0×0555. The error code (errcode) field 242 contains the numeric value of the error code being returned, as shown in Table 12. Detailed examples of process flows with errors and recovery are described below.

TABLE 12

| Error code | Error | Device response |
|---|---|---|
| 1 | Unexpected_frame_while_Running | If the Device's WDTP state is eWDTP_waitingForInit, the device must perform a RESET handshake with the Server and then restart the init sequence. Otherwise, the device can ignore this error. |
| 2 | Unexpected_frame_while_Stopped | Device resets its WDTP Manager and begins init sequence. |

Error Frame Validation Check. As described above for other WDTP frames 101, an ERROR frame 120 is typically a specific size, such that the receipt of an ERROR frame 120 having a size different than that specified size indicates a non-valid ERROR frame 120. For example, in a current embodiment of the Wireless datagram transaction protocol system 100, a valid ERROR frame 120 comprises exactly 6 bytes. Similarly, the value of a seqnum field 120 signifies an error condition, e.g. having a value other than 0×0555. As well, a valid errcode field 242 must have a valid error value, such as a value in the set {1, 2}, as shown in Table 12.

WDTP Manager and WDTP States. The application management of WDTP transactions, is typically handled through a WDTP Manager class, that contains the inbound and outbound queues and the current WDTP state. The WDTP Manager typically includes a reference (or singleton access) to the datagram interface object, as shown in Table 13. During initialization of the object WDTP Manager constructor must initialize_state to eWDTP_stopped.

TABLE 13

```
enum WDTPState
{
    eWDTP_stopped,
    eWDTP_waitingForInit,
    eWDTP_waitingForReady,
    eWDTP_waitingForReset,
    eWDTP_running
};
class WDTPManager
{
public:
// methods
    ...
private:
// members
    WDTPState  _state;           // state of WDTP
    WDTPqueue  _inbound;         // queue of inbound DATA frames
    WDTPqueue  _outbound;        // queue of outbound DATA frames
    UDP&       _udp;             // datagram interface object
};
```

Sequence Numbers and DATA Frame States. When an application has data 180 to send, it creates a DATA frame 106 that is appended to the outbound queue 131. Before the DATA frame 106 is actually transmitted, the window 254 (FIG. 18) is checked to make sure it is open.

The receiver, e.g. either the device 12 or server 14, similarly performs checking to validate an inbound DATA frame 106. The 'window' 254 is comprised of a continuous range of valid sequence numbers, wherein:

$$\text{window} = \{\text{first\_valid\_seqnum} \ldots \text{last\_valid\_seqnum}\}. \quad (17)$$

If the sequence number 108 of a DATA frame 106 lies within the window, i.e. the 'window is open', then the DATA frame 106 may be transmitted in a datagram 19.

In the algorithms presented below, the outbound window computed by the sender is a subset of the validation (inbound) window computed by the receiver. The outbound window is a subset, and often an identical set of the validation window, because the sender never shifts its outbound window until it receives an ACK 110 for the first sequence number in the outbound window.

DATA frame states. The application maintains the state of each DATA frame 106 that is in the outbound queue 131, to keep track of whether a DATA frame has been sent. As soon as a DATA frame 106 is ACK'd 110, the DATA frame 106 can be removed from the outbound queue 131. Table 14 provides a summary of DATA frame states.

TABLE 14

| | Definition |
|---|---|
| Outbound state | |
| waitingForWindow | initial state of a DATA frame; not yet sent in a datagram |
| sent | DATA frame has been transmitted in a datagram; now waiting for an ACK |
| Inbound state | |
| missing | placeholder for a DATA frame that has not yet arrived |
| ready | DATA frame has been received and is now waiting for the application to process it |

Procedure to determine whether the window is open to send a DATA frame. The sender of a DATA frame 106 must determine whether the window is open before actually transmitting it in a datagram 19. The receiver assumes that the sender does this check. The receiver uses that assumption as part of the sequence number validation when a DATA frame 106 is received.

Figure 18:
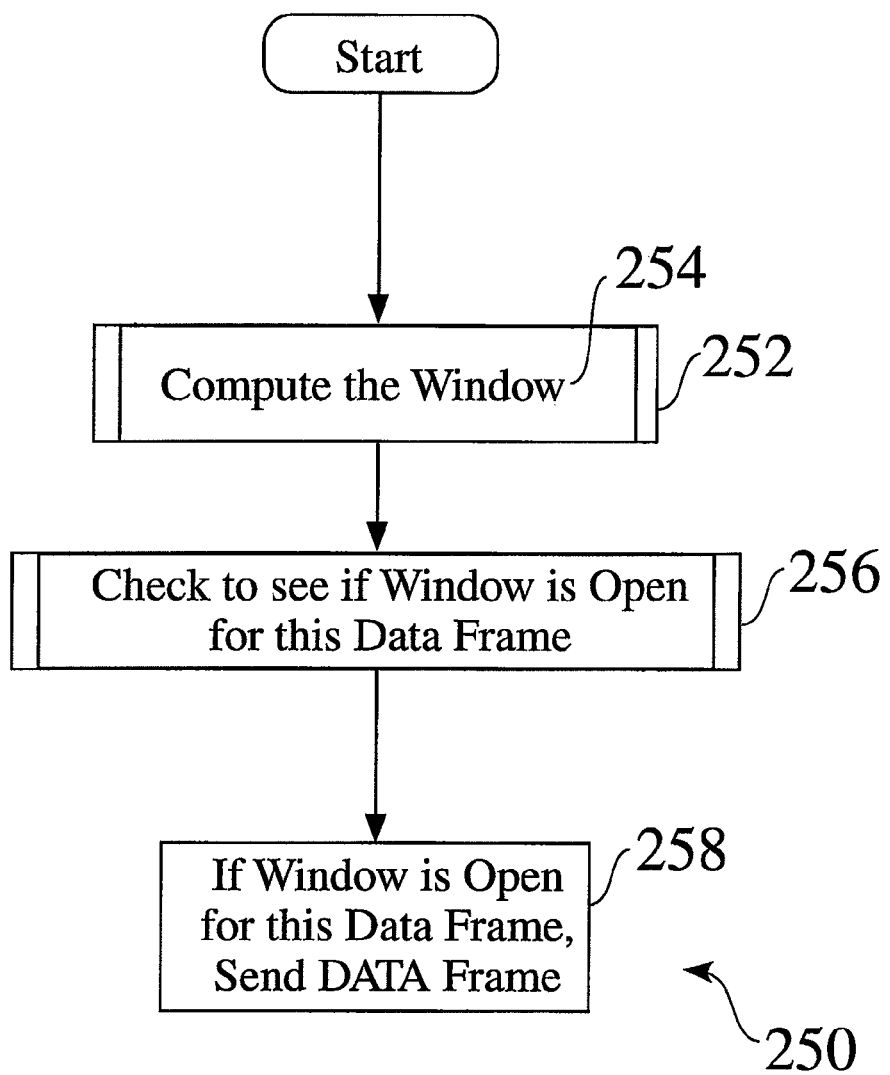
FIG. 18 is a flowchart of a process for determining whether a window is open to send a DATA frame.

FIG. 18 is a flowchart of a basic process 250 for determining whether a window is open to send a DATA frame 106. The window 254 is first determined 252, and then the computed window 254 is checked 256 to see if the window 254 is open for the DATA frame 106. If the window 254 is open, the DATA frame is sent 258.

Figure 19:
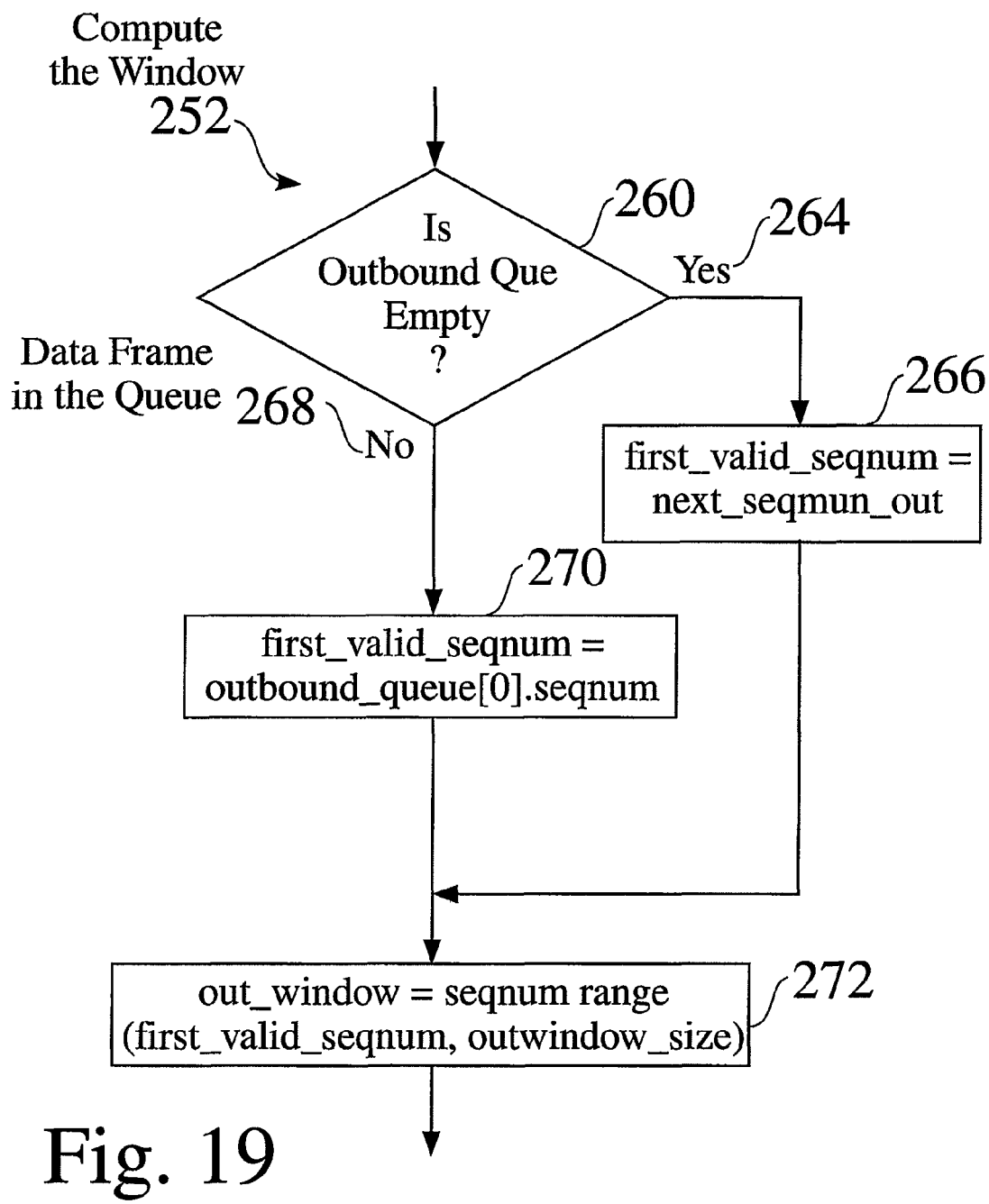
FIG. 19 is a detailed flowchart of a process for computing a window in the WDTP system.

FIG. 19 is a detailed flowchart of a process 252 for computing a window 254 in the Wireless datagram transaction protocol system 100. The state of the outbound queue 131 is determined 260. If the outbound queue 131 is empty 264, the first valid sequence number is equal to the next_seqnum_out 266. If the outbound queue 131 is not empty 268, there is a data frame 106 in the queue, such that the first_valid_seqnum is set to equal the outbound_queue<0>.seqnum 270. Once the first valid sequence number is determined 266,270, the out_window equals the seqnum range, beginning with the first_valid_seqnum, and containing outwindow_size contiguous elements, i.e. the window contains a plurality of contiguous elements, wherein the number of the plurality is determined by the outwindow_size.

Figure 20:
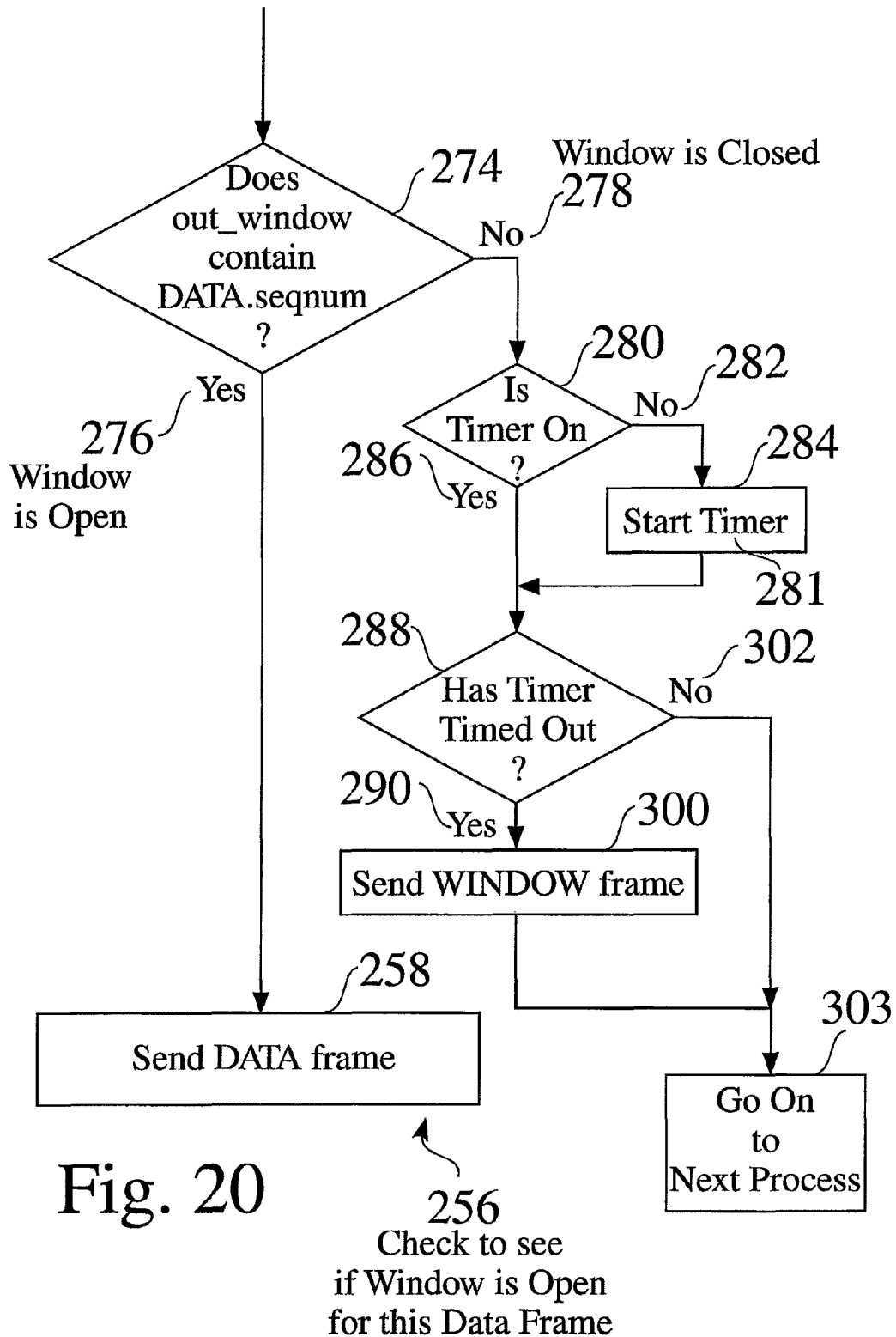
FIG. 20 is a detailed flowchart of a process for checking to see if a window is open to send a DATA frame.

FIG. 20 is a detailed flowchart of a process 256 for checking to see if a window is open to send a DATA frame 106. A determination is performed 274 to see if the out_window contains DATA.seqnum. A positive result 276 indicates that the window is open, whereby the DATA frame 106 is sent 258. If the window is closed 278, it is then determined 280 whether the timer 281 is on. In one embodiment 256, upon a positive result 286, it is then determined if the timer has timed out 288. If the timer has timed out 290, a WINDOW frame 116 is sent 300. If the timer has not timed out 302, the process returns. As well, if the timer 281 is not on 282 at step 280, the timer is started 284. In an alternate embodiment of the wireless datagram transaction protocol system 100, the timeout check 303 is provided in a separate process.

Figure 21:
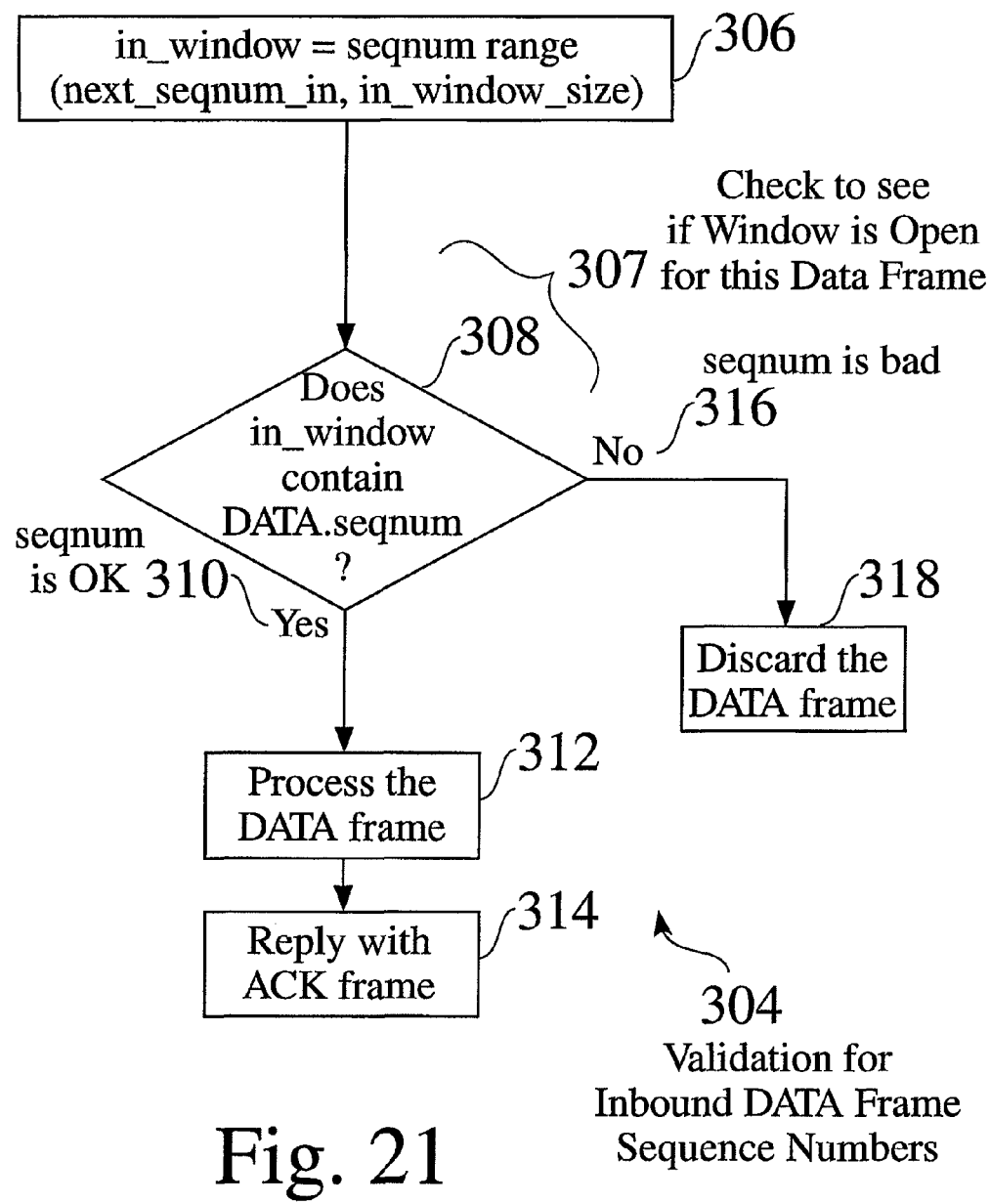
FIG. 21 is a flowchart showing validation for inbound DATA Frame sequence numbers.

Validation for inbound DATA frame sequence numbers. FIG. 21 is a flowchart 304 showing validation for inbound DATA Frame sequence numbers 108. When a DATA frame 106 is received, its sequence number 108 is validated before the DATA frame 106 is accepted. An invalid sequence number 108 implies corruption, since the receiver knows that the sender is checking for an open window before transmitting. DATA frames 106 with an invalid sequence number 108 are therefore discarded.

The window is first computed 306, wherein in_window is equal to the sequence number range defined by the next sequence number in, and the size of the in window. It is then determined 307 if the window is open to receive a given data frame 106, wherein it is determined if the in_window contains DATA.seqnum, at 308. If the determination 308 is positive 310, the DATA frame 106 is processed 312, and the recipient replies 314 with an ACK frame 110. If the determination 308 is negative 316, i.e. the sequence number is bad 316, the DATA frame 106 is discarded 318.

Rules for Updating Next_Seqnum_in and Next_Seqnum_Out.

Figure 22:
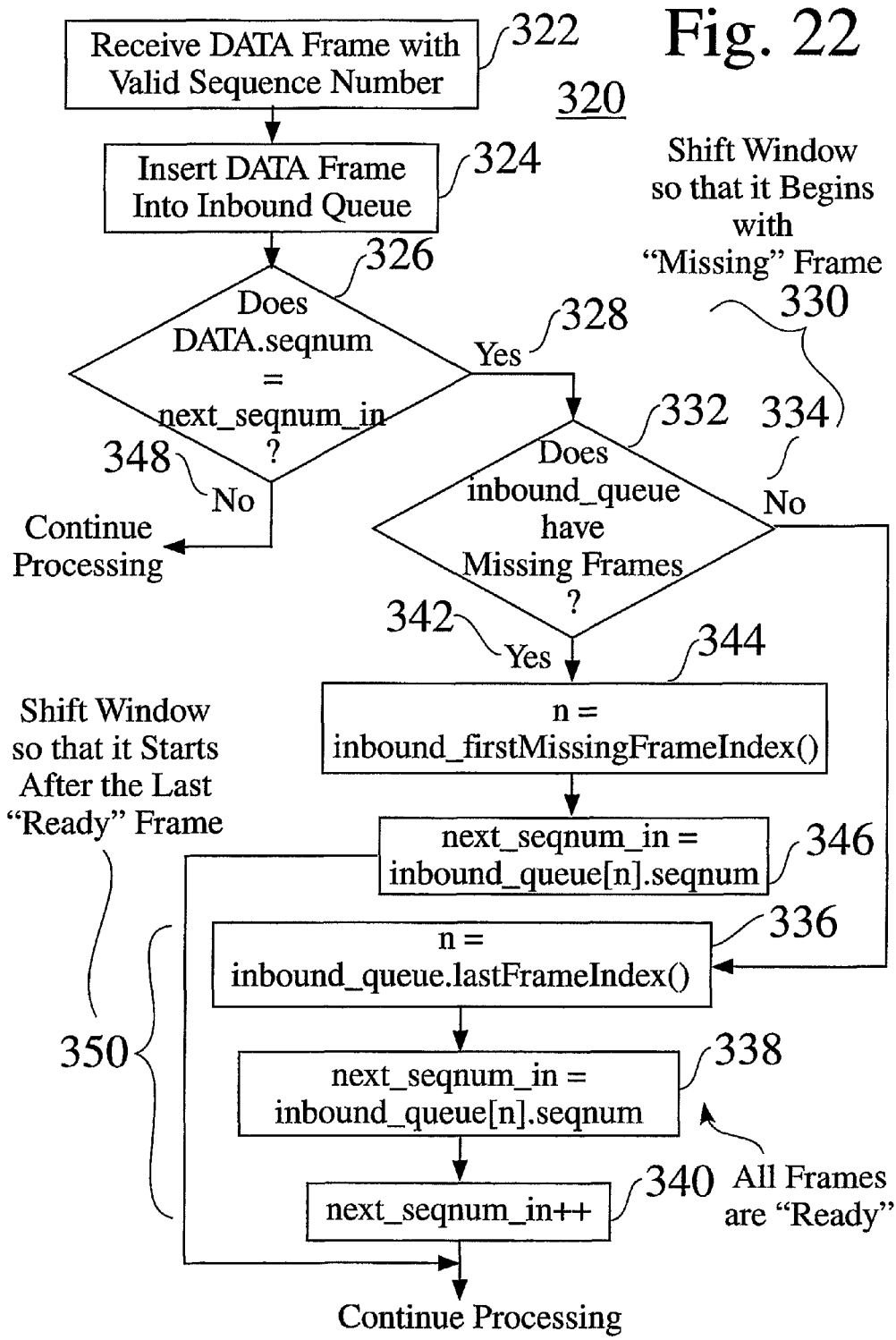
FIG. 22 is a flowchart showing rules for updating the next sequence number in and the next sequence number out.

Updating next_seqnum_in. FIG. 22 is a flowchart showing rules 320 for updating the next sequence number in. The next_seqnum_in variable should always indicate the next expected DATA frame in the inbound sequence, even though DATA frames with higher sequence numbers may have been received out of order.

Upon receipt 322 of a DATA frame 106 with a valid sequence number 108, the DATA frame is inserted 324 into the inbound queue 135 (FIG. 8). It is then determined if the DATA frame 106 and associated seqnum 108 are equal to the next_seqnum_in, at step 326.

If the determination 326 is positive 328, the window is shifted 330, to begin with the first "missing" DATA frame 106. If it is determined 332 that the inbound queue 135 does not 334 have missing frames 106, all the frames are ready, then set n equal to inbound_queue.lastFrameIndex( ) 336, then next_seqnum_in=inbound_queue<n>.seqnum 338, and the process continues to next_seqnum_in++340. If it is determined 332 that the inbound queue 135 does 342 have missing frames 106, n=inbound_firstMissingFrameIndex( ) 344, and next_seqnum_in=inbound_queue<n>.seqnum 346. The algorithm for this process is seen in Table 15.

TABLE 15

```
receive DATA frame with valid sequence number
insert DATA frame into inbound_queue
if ( DATA.seqnum == next_seqnum_in )
{
    if ( inbound_queue.hasMissingFrames( ) )
    {
        // shift the window so that it begins with the 1st 'missing' frame
        n = inbound_queue.firstMissingFrameIndex( );
        next_seqnum_in = inbound_queue<n>.seqnum
    }
    else // all frames are 'ready'
    {
        // shift the window so that it starts after the last 'ready' frame
        n = inbound_queue.lastFrameIndex( );
        next_seqnum_in = inbound_queue<n>.seqnum;
        next_seqnum_in++;
    }
}
```

Updating next_seqnum_out. The next_seqnum_out variable indicates the sequence number 108 of the next DATA frame 106 that will be added to the outbound queue 131. The next_seqnum_out variable is incremented each time a new DATA frame is added to the outbound queue 131.

Figure 23:
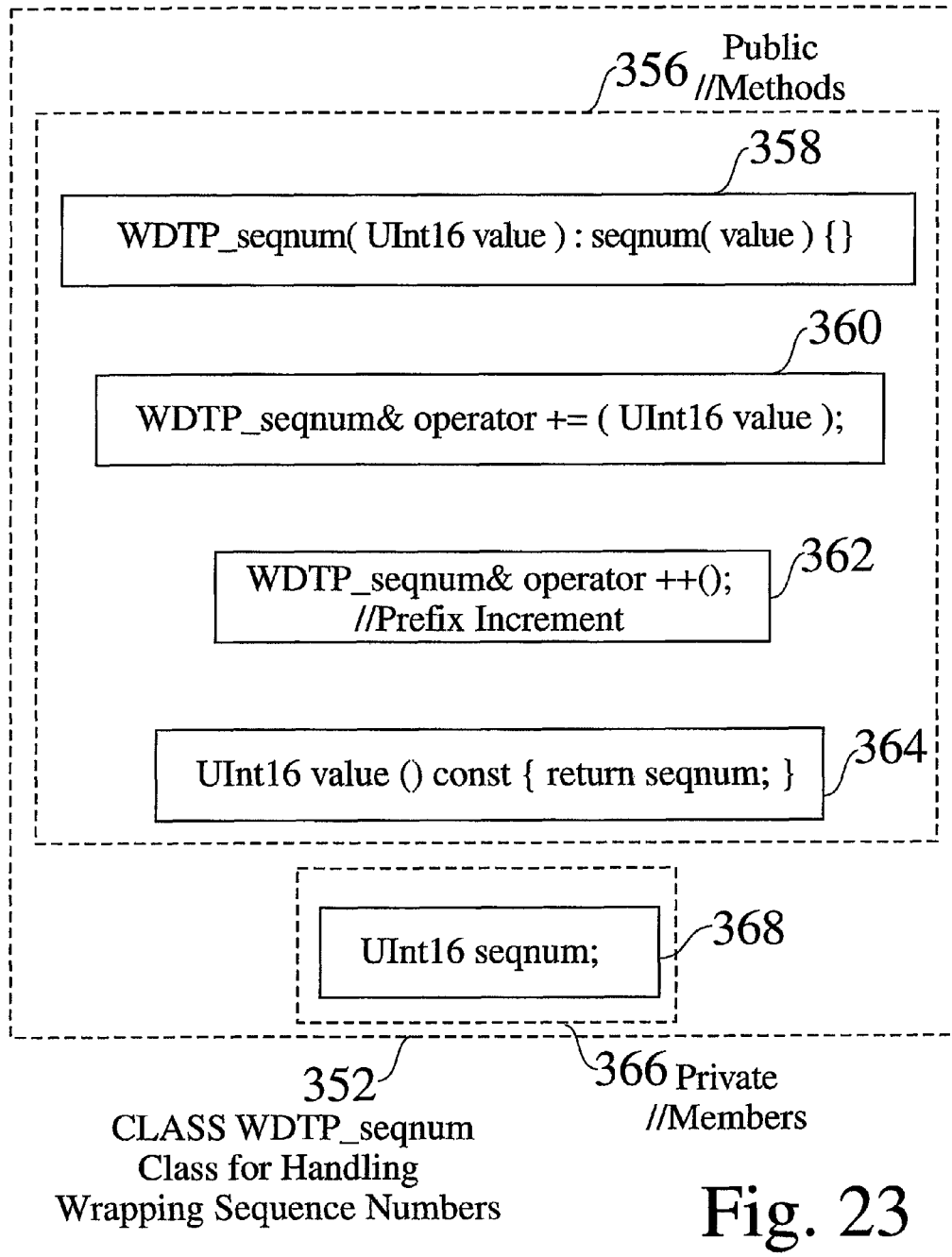
FIG. 23 is a flowchart showing a class for handling wrapping sequence numbers.

Class for handling wrapping sequence numbers. In some embodiments of the wireless datagram transaction protocol system 100, sequence numbers, such as associated sequence number 108 and ACK sequence numbers 112, may be contained in an object and manipulated through class functions that accommodate the wrapping property, as shown in Table 16. FIG. 23 is a diagram 352 showing a class for handling wrapping sequence numbers.

TABLE 16

```
class WDTP_seqnum
{
public:
// methods
    WDTP_seqnum( UInt16 seqnum ) : _seqnum( seqnum ) { }
    WDTP_seqnum& operator += ( UInt16 value );
    WDTP_seqnum& operator ++ ( ); // prefix increment
    UInt16 Value( ) const { return _seqnum; }
private:
// members
    UInt16 _seqnum;
};
```

Figure 24:
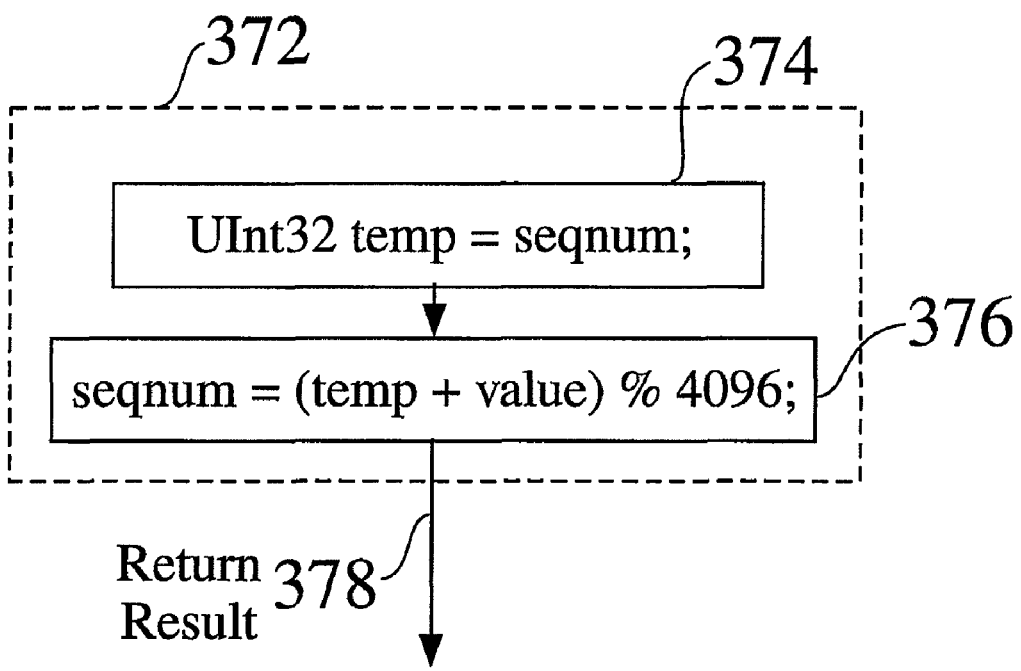
FIG. 24 and FIG. 25 show operator methods for wireless datagram transaction protocol (WDTP) sequence numbers.
Figure 25:
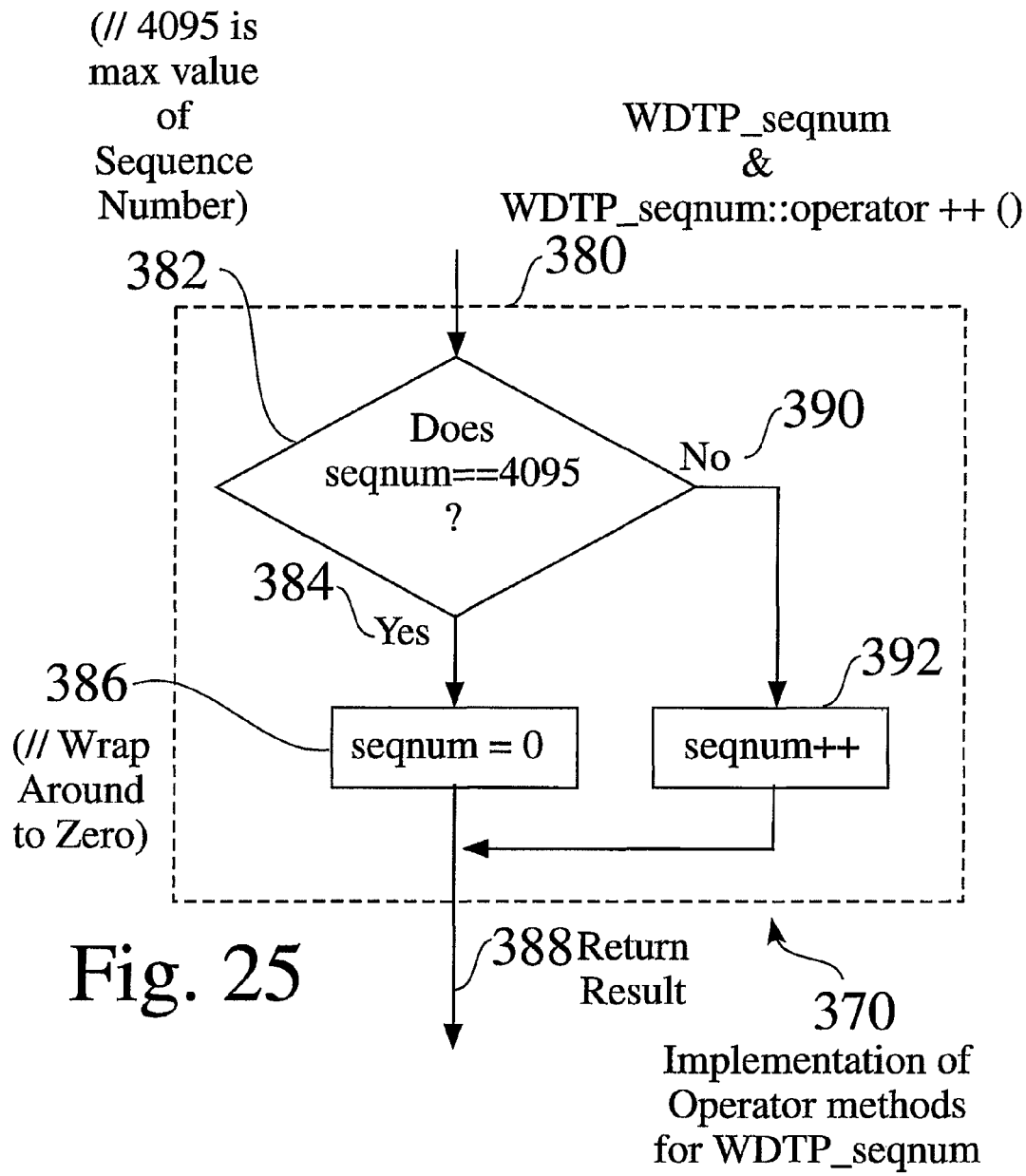

FIG. 24 and FIG. 25 show an implementation of operator methods 372, 380 for wireless datagram transaction protocol (WDTP) sequence numbers. An algorithm for the implementation of the operator methods for WDTP_seqnum is shown in Table 17.

TABLE 17

```
WDTP_seqnum& WDTP_seqnum::operator += ( UInt16 value )
{
    UInt32 temp = _seqnum;
    _seqnum = (temp + value) % 4096;
    return *this;
}
WDTP_seqnum& WDTP_seqnum::operator ++ ( )
{
    if ( _seqnum == 4095 ) // 4095 is the max value of a
    sequence number
    {
        _seqnum = 0; // wrap around to zero
    }
    else
    {
        _seqnum++;
    }
    return *this;
}
```

Class for handling windows of sequence numbers. In a typical embodiment of the wireless datagram transaction protocol system 100, as seen in FIG. 8, the value of sequence numbers 108 can wrap. Therefore, a window of values can possibly fall into two ranges. For example, a window with a size of 10 that starts with the sequence number 4090 would contain the following values:

window(4090, 10)={4090, 4091, 4092, 4093, 4094, 4095, 0, 1, 2, 3}

That set of values is comprised of two disjoint subsets: {4090, 4091, 4092, 4093, 4094, 4095} and {0, 1, 2, 3}

In a wireless datagram transaction protocol system 100 that limits the window size to 1024 frames, which is smaller than the range of possible sequence numbers, a window cannot wrap more than once. Therefore, it is only necessary for a window to support at most two disjoint subsets.

Figure 26:
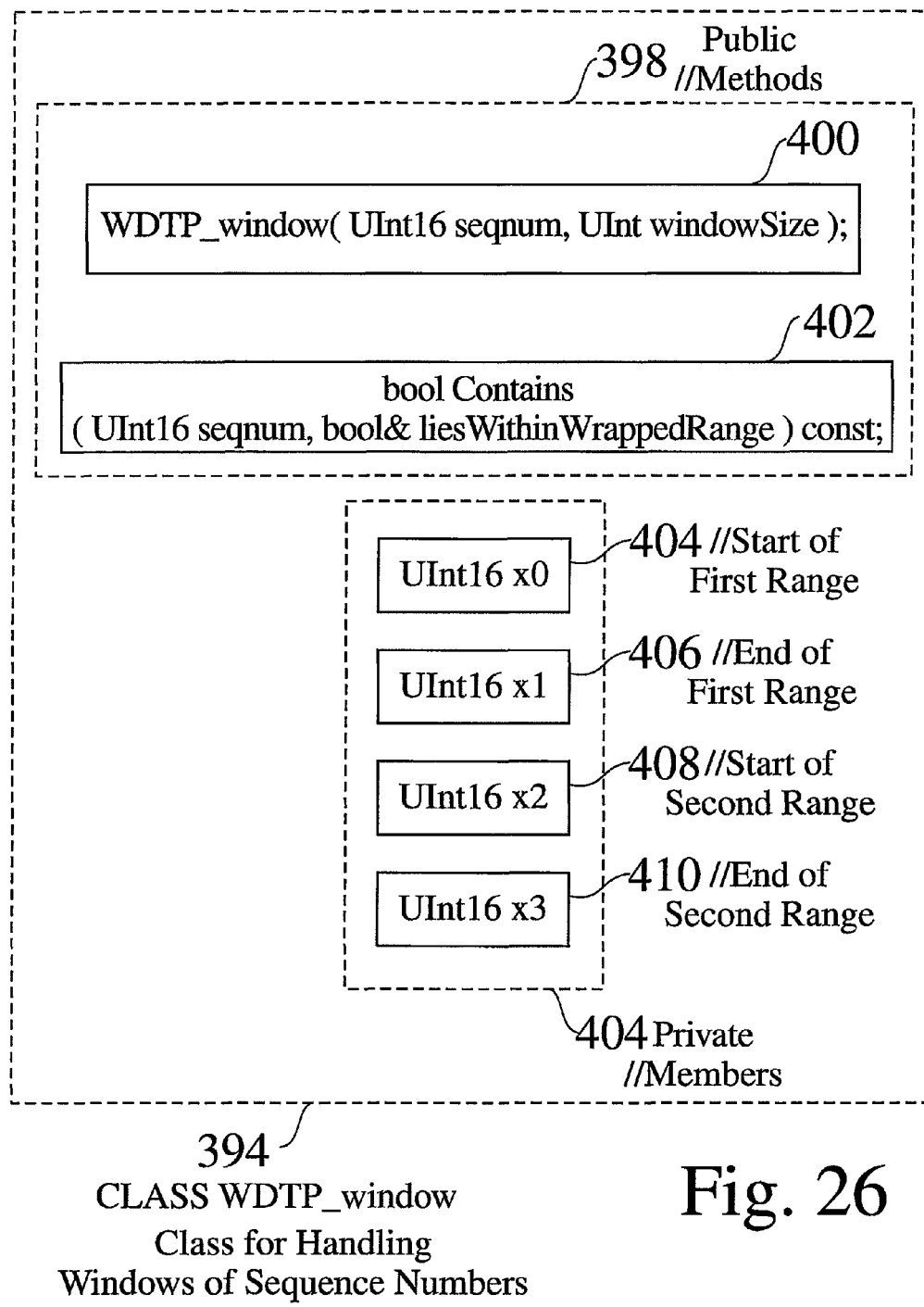
FIG. 26 is a flowchart showing a class for handling the processing of windows comprising sequence numbers.

A method for encapsulation of window behavior within a class is seen in Table 18. FIG. 26 is a diagram 394 illustrating the associated processing of windows comprising sequence numbers, as shown in Table 18.

TABLE 18

```
class WDTP_window
{
public:
// methods
    WDTP_window( UInt16 seqnum, UInt16 windowSize );
    bool Contains( UInt16 seqnum, bool& liesWithinWrappedRange )
const;
```

TABLE 18-continued

```
private:
// members
    UInt16 __x0; // start of 1st range
    UInt16 __x1; // end of 1st range
    UInt16 __x2; // start of 2nd range
    UInt16 __x3; // end of 2nd range
};
```

In practice, the WDTP_window class is typically processed as shown:

TABLE 19

```
WDTP_window in__window( next__seqnum__in, in__window__size );
bool liesWithinWrappedRange;
if ( in__window.Contains( DATA.seqnum, liesWithinWrappedRange ) )
{
    // Process DATA frame
}
```

Figure 27:
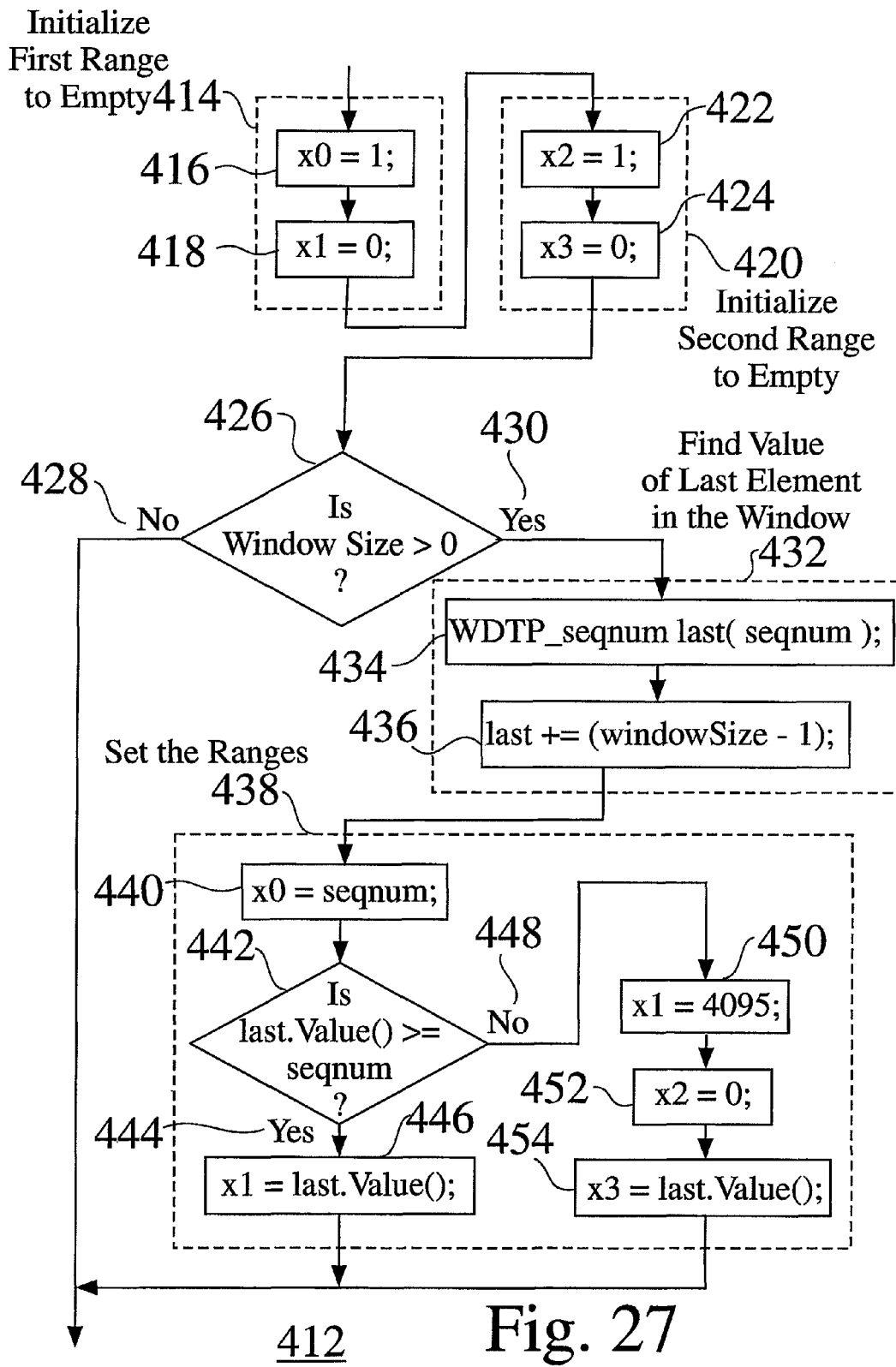
FIG. 27 is a flowchart showing an implementation of construction for a wireless datagram transaction protocol (WDTP) window.

Construction of WDTP Window. FIG. 27 is a flowchart showing the process 412 of constructing a wireless datagram transaction protocol (WDTP) window, having an algorithm seen in Table 20.

TABLE 20

```
WDTP_window:: WDTP_window( UInt16 seqnum,
UInt16 windowSize )
{
    // initialize the 1st range so it's empty
    __x0 = 1;
    __x1 = 0;
    // initialize the 2nd range so it's empty
    __x2 = 1;
    __x3 = 0;
    if ( windowSize > 0 )
    {
        // find the value of the last element in the window
        WDTP_seqnum last( seqnum );
        last += (windowSize – 1);
        // set the ranges
        __x0 = seqnum;
        if ( last.Value( ) >= seqnum )
        {
            __x1 = last.Value( );
        }
        else // it wrapped
        {
            __x1 = 4095;
            __x2 = 0 ;
            __x3 = last.Value( );
        }
    }
}
```

Table 21 provides an algorithm showing a Contains( ) method for WDTP_window.

TABLE 21

```
bool WDTP_window::Contains( UInt16 seqnum, bool&
liesWithinWrappedRange ) const
{
    liesWithinWrappedRange = false;
    if ( __x0 <= seqnum && seqnum <= __x1 )
    {
        return true;
    }
    if ( __x2 <= seqnum && seqnum <= __x3 )
    {
        liesWithinWrappedRange = true;
        return true;
    }
    return false;
}
```

WDTP System Timeouts. FIG. 28 is a schematic diagram of server timeout rules 460 in the wireless datagram transaction protocol system 100. The server 14 and the device 12 are each responsible for timing out certain transactions. While basic embodiments of the wireless datagram transaction protocol system 100 do not use adaptive timeouts, alternate embodiments of the wireless datagram transaction protocol system 100 are able to adjust timeouts, based on perceived network speed. The following server rules are implemented in some embodiments of the wireless datagram transaction protocol system 100.

The server checks for overdue ACK frames every M seconds.

The server checks for overdue DATA frames every N seconds.

An ACK frame 110 is overdue at the server 14 if it is not received within P seconds.

A DATA frame 106 is overdue at the server 14 if it is not received within Q seconds.

M, N, P, and Q are all host configurable.

FIG. 29 is a schematic diagram of device timeout rules 470 in the wireless datagram transaction protocol system 100. The following server rules are implemented in some embodiments of the wireless datagram transaction protocol system 100.

The device 12 uses a timer that can activate the application if it is dormant.

Events that should clear the window-closed timer are typically limited to:

receiving an ACK (or overlapping ACK) frame for the very first DATA frame in the outbound queue receiving a RETRY frame that allows the device to implicitly ACK the very first DATA frame in the outbound queue Examples of Process Flows with No Errors. FIG. 30 and FIG. 31 show process flow 490*a*,490*b* in the wireless datagram transaction protocol system 100 with no errors. FIG. 32 shows a process 520 for sending DATA frames from a device 12 to a server 14. FIG. 33 shows a detailed process 550 for sending acknowledgement ACK frames from a server 14 and a device 12. When there are no errors, the scenarios shown in FIG. 32 and FIG. 33 are identical for the server 14 sending a DATA frame 106, and the device 12 replying with an ACK frame 110.

Error Scenarios and Processes. The wireless datagram protocol system 100 provides comprehensive control for error scenarios and responses. FIG. 34 is an overview chart 570 which shows error categories and associated process flows within a wireless datagram transaction protocol (WDTP) system 100.

Error Scenarios. FIG. 35 is a chart 600 which shows error scenarios and responses for lost INIT Frames and READY Frames. FIG. 36 is a chart 620 which shows error scenarios and responses for lost DATA Frames. FIG. 37 is a chart 640 which shows error scenarios and responses for lost ACK Frames. FIG. 38 is a chart 660 which shows error scenarios and responses for a lost RETRY Frame. FIG. 39 is a chart 680 which shows error scenarios and responses for a lost WINDOW Frame. FIG. 40 is a chart 700 which shows error scenarios and responses for a lost RESET Frame. FIG. 41 is a chart 720 which shows an error scenario and response for a lost ERROR Frame. FIG. 42 is a chart 760 which shows error scenarios and responses for a duplicate Frame received. FIG. 43 is a chart 780 which shows error scenarios and responses to the arrival of a bogus frame having a valid header. FIG. 44 is a chart 800 which shows error scenarios and responses for a Frame received with an invalid frame type. FIG. 45 is a chart 820 which shows error scenarios and responses for a Frame received with an Invalid sequence number. FIG. 46 is a chart 860 which shows error scenarios and responses for a DATA Frame which is received before an INIT Frame. FIG. 47 is a chart 900 which shows error scenarios and responses for an INIT Frame which is received after a DATA Frame.

Sample Process Flows with Errors and Recovery. The wireless datagram protocol system 100 provides an integrated set of process responses to error conditions. Some exemplary process responses are shown in Table 22.

TABLE 22

1. Init sequence with timeouts
2. DATA, ACK, WINDOW, and RETRY interaction with timeouts
   a. Device 12 sends 2 DATA frames, the first never arrives
   b. Device 12 sends 3 DATA frames; number 1 and 2 never arrive, the window is closed for number 3
   c. Server 14 sends 2 DATA frames, the first never arrives
   d. Device 12 sends 1 ACK frame, it never arrives
3. Responding to ERROR - Unexpected_frame_while_Running
4. Responding to ERROR - Unexpected_frame_while_Stopped In the detailed flows shown in FIG. 48 to FIG. 56, the frames are enclosed within [ ]'s. Only the relevant parts of the frame are shown. For example, DATA frames are displayed as [DATA:nnn] where 'nnn' is the sequence number, but the actual data is not shown.

FIG. 48 and FIG. 49 show wireless datagram transaction protocol system 100 process flow 940a,940b through an Init sequence with timeouts. FIG. 50 shows beginning device 12 and server 14 states 970 for DATA, ACK, WINDOW, and RETRY processes. FIG. 51 shows exemplary state interactions 990 between a device 12 and a server 14, when the device 12 sends two DATA Frames 106, and the first frame 106 never arrives at the server 14. FIG. 52 shows exemplary state interactions 1000 between a device 12 and a server 14, when the device 12 sends three DATA Frames 106, wherein the first and second DATA frames 106 never arrive at the server 14, and wherein the WINDOW is closed for the third DATA frame 106. FIG. 53 shows exemplary state interactions 1040 between a device 12 and a server 14, when the server 14 sends two DATA frames 106, and the first DATA frame 106 never arrives at the device 12. FIG. 54 shows exemplary state interactions 1080 between a device 12 and a server 14, when the device 12 sends an ACK Frame 110, which never arrives at the server 14. FIG. 55 shows exemplary state interactions 1120 between a device 12 and a server 14, when the server 14 receives an unexpected INIT frame 102 while in the Running state. FIG. 56 shows exemplary state interactions 1160 between a device 12 and a server 14, when the server 14 receives an unexpected DATA frame 106 while in the Stopped state.

Although the wireless datagram transaction protocol system 100 and its methods of use are described herein in connection with wireless devices, personal computers and other microprocessor-based devices, such as wireless appliances, the apparatus and techniques can be implemented for a wide variety of electronic devices and systems, or any combination thereof, as desired.

Furthermore, while the wireless datagram transaction protocol system 100 and its methods of use are described herein in connection with wireless devices and intranets or LAN's, the apparatus and techniques can be implemented for a wide variety of electronic devices and networks or any combination thereof, as desired.

As well, while the wireless datagram transaction protocol system 100 and its methods of use are described herein in connection with a time based interaction between a wireless device and a server, the wireless datagram transaction protocol can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A device, comprising:
   a transmitter for sending forward link wireless signals from the device toward a second device, wherein the second device comprises an inbound queue;
   a receiver for receiving reverse link wireless signals at the device from the second device; and
   a processor programmed to provide an acknowledgement frame to the transmitter for transmission toward the second device, the acknowledgement frame associated with a DATA frame of a sequence of DATA frames that is received from the second device, wherein the received DATA frame comprises an associated sequence number, and wherein the acknowledgement frame comprises
     an acknowledgement sequence number that matches the sequence number associated with the received DATA frame,
     a number count of sequential DATA frames within the sequence received at the wireless device preceding and contiguous to the received DATA frame having the matching sequence number,
     a number count of sequential DATA frames within the sequence received at the wireless device following and contiguous to the received DATA frame having the matching sequence number,
     a Boolean at top field that is set to true when there are no missing DATA frames in the inbound queue prior to the received DATA frame having the matching sequence number.

2. The device of claim 1, wherein any of the device or the second device is any of a wireless device, a server, or a wired device.

3. The device of claim 1, wherein any of the device or the second device comprises any of a portable computer, a portable phone, a personal digital assistant, or an electronic game device.

4. The device of claim 1, wherein the device and the second device communicate the wireless signals over any of a TDMA wireless packet network or a CDMA wireless packet network.

5. The device of claim 1, further comprising:
   an inbound queue for storing DATA frames.

6. The device of claim 5, wherein the processor is further programmed to hold the received DATA frame within the inbound queue of the device until all DATA frames before the received DATA frame in the sequence are received.

7. A process implemented across a network between a first device and a second device, comprising the steps of:
   sending a sequence of wireless DATA frames between a first device and a second device, wherein the first device comprises an outbound queue for storing DATA frames that have been sent toward the second device;
   sending an acknowledgement frame from the second device to the first device in response to at least one received DATA frame, the acknowledgment frame comprising
     an acknowledgement sequence number that refers to the received DATA frame, the DATA frame having an associated sequence number that matches the acknowledgement sequence number,
a number count of sequential DATA frames within the sequence received at the second device preceding and contiguous to the DATA frame having the matching sequence number, and
a number count of sequential DATA frames within the sequence received at the second device following and contiguous to the DATA frame having the matching sequence number; and
removing a stored DATA frame from the outbound queue at the first device in response to an acknowledgement frame received at the first device having any of
an acknowledgement sequence number that corresponds to the sequence number of the stored DATA frame, or
a number count that implies receipt of the stored DATA frame.

8. A process implemented across a network between a first device and a second device, comprising the steps of:
sending a sequence of wireless DATA frames between a first device and a second device;
sending an acknowledgement frame from the second device to the first device in response to at least one received DATA frame, the acknowledgment frame comprising
an acknowledgement sequence number that refers to the received DATA frame, the DATA frame having an associated sequence number that matches the acknowledgement sequence number,
a number count of sequential DATA frames within the sequence received at the second device precedinq and contiguous to the DATA frame having the matching sequence number, and
a number count of sequential DATA frames within the sequence received at the second device following and contiguous to the DATA frame having the matching sequence number; and
sending at least one subsequent DATA frame within the sequence from the first device to the second device before receiving the acknowledgement frame having the acknowledgement sequence number that refers to the previously sent DATA frame.

9. The process of claim 8, wherein the first device comprises an outbound queue for storing DATA frames that have been sent toward the second device.

10. The process of claim 9, further comprising the step of:
removing a stored DATA frame from the outbound queue at the first device in response to an acknowledgement frame received at the first device having an acknowledgement sequence number that corresponds to the sequence number of the stored DATA frame.

11. The process of claim 9, further comprising the step of:
removing a stored DATA frame from the outbound queue at the first device in response to an acknowledgement frame received at the first device having a number count that implies receipt of the stored DATA frame.

12. The process of claim 8, wherein the second device comprises an inbound queue for storing DATA frames.

13. The process of claim 12, further comprising the step of:
holding the received DATA frame within the inbound queue at the second device until all DATA frames before the received DATA frame in the sequence are received.

14. A process implemented across a network between a first device and a second device, comprising the steps of:
sending a sequence of wireless DATA frames between a first device and a second device;
sending an acknowledgement frame from the second device to the first device in response to at least one received DATA frame, the acknowledgment frame comprising
an acknowledgement sequence number that refers to the received DATA frame, the DATA frame having an associated sequence number that matches the acknowledgement sequence number,
a number count of sequential DATA frames within the sequence received at the second device preceding and contiguous to the DATA frame having the matching sequence number, and
a number count of sequential DATA frames within the sequence received at the second device following and contiguous to the DATA frame having the matching sequence number; and
holding the received DATA frame within an inbound queue at the second device until all DATA frames before the received DATA frame in the sequence are received.

15. The process of claim 14, wherein any of the first device or the second device is any of a wireless device, a server, or a wired device.

16. The process of claim 14, wherein any of the first device or the second device comprises any of a portable computer, a portable phone, a personal digital assistant, or an electronic game device.

17. The process of claim 14, wherein the network comprises any of a TDMA wireless packet network or a CDMA wireless packet network.

18. A process implemented across a network between a first device and a second device, comprising the steps of:
sending a sequence of wireless DATA frames between a first device and a second device, wherein the second device comprises an inbound queue; and
sending an acknowledgement frame from the second device to the first device in response to at least one received DATA frame, the acknowledgment frame comprising
an acknowledgement sequence number that refers to the received DATA frame, the DATA frame having an associated sequence number that matches the acknowledgement sequence number,
a number count of sequential DATA frames within the sequence received at the second device preceding and contiguous to the DATA frame having the matching sequence number,
a number count of sequential DATA frames within the sequence received at the second device following and contiguous to the DATA frame having the matching sequence number, and
a Boolean at top field that is set to true when there are no missing DATA frames in the inbound queue prior to the received DATA frame having the matching sequence number.

19. A process implemented across a network between a first device and a second device, comprising the steps of:
sending a sequence of DATA frames from the first device to the second device, wherein the first device has an outbound queue for storing DATA frames that have been sent toward the second device;
sending and acknowledgement frame from the second device to the first device in response to a received DATA frame, the acknowledgment frame comprising
an acknowledgement sequence number that refers to the received DATA frame, the DATA frame having an associated sequence number that matches the acknowledgement sequence number, and a range value of any other DATA frames within the sequence that have been received at the wireless device, wherein the range value overlaps the DATA frame having the matching sequence number; and removing at least one stored DATA frame from the outbound queue at the first device in response to an acknowledgement frame received at the first device having any of an acknowledgement sequence number that corresponds to the sequence number of the stored DATA frame, or a range value that implies receipt of a DATA frame other than the DATA frame having the associated sequence number.

20. The process of claim 19, wherein the acknowledgement sequence number acknowledges receipt at the second device of the DATA frame having the matching sequence number.

21. The process of claim 19, wherein the range value acknowledges receipt at the second device of at least one other DATA frame within the sequence other than the DATA frame having the matching sequence number.

22. A process implemented across a network between a first device and a second device, comprising the steps of:

sending a sequence of DATA frames from the first device to the second device;

sending and acknowledgement frame from the second device to the first device in response to a received DATA frame, the acknowledgment frame comprising an acknowledgement sequence number that refers to the received DATA frame, the DATA frame having an associated sequence number that matches the acknowledgement sequence number, and a range value of any other DATA frames within the sequence that have been received at the wireless device, wherein the range value overlaps the DATA frame having the matching sequence number; and sending at least one subsequent DATA frame within the sequence from the first device to the second device before receiving the acknowledgement frame having the acknowledgement sequence number that refers to a previously sent DATA frame.

23. The process of claim 22, wherein the first device has an outbound queue for storing DATA frames that have been sent toward the second device.

* * * * *